(12) United States Patent
Stephens et al.

(10) Patent No.: US 8,340,024 B2
(45) Date of Patent: *Dec. 25, 2012

(54) VIRTUAL LINKING USING A WIRELESS DEVICE

(75) Inventors: Spencer Stephens, Toluca Lake, CA (US); Duke Kamstra, Thousand Oaks, CA (US); James M. Jollota, Simi Valley, CA (US); James Fuhring, Ventura, CA (US); James Beasley, Simi Valley, CA (US)

(73) Assignee: Strix Systems, Inc., Westlake Village, CA (US)

( * ) Notice: Subject to any disclaimer, the term of this patent is extended or adjusted under 35 U.S.C. 154(b) by 323 days.

This patent is subject to a terminal disclaimer.

(21) Appl. No.: 12/706,969

(22) Filed: Feb. 17, 2010
(Under 37 CFR 1.47)

(65) Prior Publication Data

US 2010/0183025 A1 Jul. 22, 2010

Related U.S. Application Data

(63) Continuation of application No. 11/625,138, filed on Jan. 19, 2007, now Pat. No. 7,684,438, which is a continuation of application No. 10/218,178, filed on Aug. 12, 2002, now Pat. No. 7,170,857.

(60) Provisional application No. 60/311,716, filed on Aug. 10, 2001.

(51) Int. Cl.
*H04W 4/00* (2009.01)
(52) U.S. Cl. .......................... 370/328; 370/465; 370/401
(58) Field of Classification Search ................... 370/466, 370/465, 401–402, 310.2, 328, 338, 349, 370/395.5, 467
See application file for complete search history.

(56) References Cited

U.S. PATENT DOCUMENTS

| | | | |
|---|---|---|---|
| 5,224,205 | A | 6/1993 | Dinkin et al. |
| 5,815,811 | A | 9/1998 | Pinard et al. |
| 5,968,116 | A | 10/1999 | Day, II et al. |
| 5,979,757 | A | 11/1999 | Tracy et al. |
| 6,002,918 | A | 12/1999 | Heiman et al. |

(Continued)

FOREIGN PATENT DOCUMENTS

EP 0781005 6/1997

(Continued)

OTHER PUBLICATIONS

Avancha, Sasikanth et al., Enhancing the Bluetooth Service Discovery Protocol,: Technical Report TR-CD-01-08, Alternatively titled "Semantic Service Discovery in Bluetooth," 8 pages, http://research.ebiquity.org/re/papers/enhancedsdp.pdf, Department of Computer Science and Electrical Engineering, Univeristy of Maryland, Baltimore County, Aug. 2001.

(Continued)

*Primary Examiner* — Brenda H Pham
(74) *Attorney, Agent, or Firm* — Foley and Lardner LLP; Christopher J. McKenna

(57) ABSTRACT

A system and method for virtual linking a wireless device to another device is disclosed herein. The system includes an access point and a controller configured to mediate transmissions between the wireless device and the another device. The system further includes a virtual device table and a permissions filter to ensure virtual linking between devices that have matching access right and requested services. The wireless device and the another device may have the same or dissimilar protocols.

26 Claims, 15 Drawing Sheets

U.S. PATENT DOCUMENTS

| | | | |
|---|---|---|---|
| 6,018,770 | A | 1/2000 | Little et al. |
| 6,067,297 | A | 5/2000 | Beach |
| 6,084,528 | A | 7/2000 | Beach et al. |
| 6,101,528 | A | 8/2000 | Butt |
| 6,134,587 | A | 10/2000 | Okanoue et al. |
| 6,178,426 | B1 | 1/2001 | Klein et al. |
| 6,188,681 | B1 | 2/2001 | Vesuna |
| 6,199,753 | B1 | 3/2001 | Tracy et al. |
| 6,286,047 | B1 | 9/2001 | Ramanathan et al. |
| 6,430,395 | B2 | 8/2002 | Arazi et al. |
| 6,873,620 | B1 | 3/2005 | Coveley et al. |
| 6,947,404 | B1 | 9/2005 | Zalka |
| 6,956,833 | B1 | 10/2005 | Yukie et al. |
| 7,065,058 | B1 | 6/2006 | Korus |
| 7,079,518 | B2 | 7/2006 | Park et al. |
| 7,170,857 | B2 * | 1/2007 | Stephens et al. ............ 370/230 |
| 7,684,438 | B2 * | 3/2010 | Stephens et al. ............ 370/466 |

FOREIGN PATENT DOCUMENTS

| | | |
|---|---|---|
| EP | 0856812 A2 | 8/1998 |
| EP | 0856812 A3 | 5/1999 |
| EP | 0930766 | 7/1999 |
| EP | 1011278 A2 | 6/2000 |
| EP | 1017197 A2 | 7/2000 |
| EP | 1011278 A3 | 8/2000 |
| EP | 1098477 | 5/2001 |
| EP | 1017197 A3 | 8/2002 |
| GB | 2366131 A | 2/2002 |
| WO | WO 96/04734 | 2/1996 |
| WO | WO 98/17032 | 4/1998 |
| WO | 10103743 A1 | 8/2001 |

OTHER PUBLICATIONS

Bettstetter, Christian et al., "A Comparison of Service Discovery Protocols and Implementation of the Service Location Protocol," 8 pages, http://www.lkn.ei.turn.de/lkn/mitabeiter/chris/publications/eunice2000-spl.pdf, EUNICE 2000, Sixth EUNICE Open European Summer School: Innovative Internet Applications, Twente, Netherlands, Sep. 13-15, 2000.

Gryazin, Eugene A., "Service Discovery in Bluetooth," 4 pages, http://www.es.hut.fi/Opinnot/Tik-86.174/SD_in_Bluetooth.pdf, "Bluetooth Technology and Utilization," Department of Computer Science, Helsinki University of Technology, Finland, presented Nov. 9, 2000.

McGrath, Robert E., "Discovery and its Discontents: Discovery Protocols for Ubiquitous Computing," pp. 1-14, http://archive.nesa.uiue.edu/People/mcgrath/Discovery/dp.pdf, Presented Apr. 5, 2000 at Center Flight Center, Greenbelt, for Excellence in Space Data and Information Science, NASA Goddard Space Center, Greenbelt, Maryland, Mar. 25, 2000.

Miller, Brent A. et al., "Salutation Service Discovery in Pervasive Computing Environments," IBM Pervasive Computing, pp. 1-16, http://www-3.ibm.com/pvc/tech/salutation.shtml, White Plains, NY, Feb. 2000.

Salutation Consortium, Inc., "Salutation Architecture Specification (Part-1) Version 2.1," pp. 1-81, www.salutation.org, Highland, Utah. Apr. 3, 2000.

Sun Microsystems, Inc., SD-Jini Service Discovery Utilities Specification,: pp. 1-20, http://www.sun.com/software/jini/specs/jini1.2html/servicediscultil-spec.html, Santa Clara, California, copyright 1997-2000.

Xu, Dongyan et al., "Supporting Multimedia Service Polymorphism in Dynamic and Heterogeneous Environments," Technical Report UIUCDCS-R-2000-2159, pp. 1-31, http://www-old.cs.uiuc.edu/Dienst/Repository/2.0/Body/nestrl.uiuc_cs/UIUCDCS-R-200-2159.pdf, Department of Computer Science, University of Illinois at Urbana-Champaign, (submitted for journal publication), Oct. 2000.

* cited by examiner

VIRTUAL LINKING USING A WIRELESS DEVICE

CROSS-REFERENCE TO RELATED APPLICATION(S)

This is a continuation application of U.S. patent application Ser. No. 11/625,138, filed Jan. 19, 2007, which is a continuation of U.S. patent application Ser. No. 10/218,178, filed Aug. 12, 2002 (now U.S. Pat. No. 7,170,857), which application claims priority from U.S. Provisional Patent Application Ser. No. 60/311,716, filed Aug. 10, 2001, the contents of which are incorporated by reference herein in their entirety.

TECHNICAL FIELD

The present disclosure relates in general to providing services for use by a wireless device.

BACKGROUND

A personal communications network (PCN) is configured to permit one or more wireless devices to connect with wireless or wired devices included in the PCN. The PCN utilizes wireless networking technology such as IEEE 802.11, which uses direct-sequence spread spectrum, or Bluetooth, which uses frequency-hopping spread spectrum. The connection facilitates voice and data transmissions between the initiating wireless device (the "user device") and the selected receiving device (the "service device").

The user device has two ways of accessing services available at the service device. The first way is for the user device to directly connect or link with the service device. Both devices will typically include a common profile or protocol to permit the connection. For example, if the user device is a Bluetooth enabled personal digital assistant (PDA) and the service device is a Bluetooth enabled printer, then the user device can wirelessly link with the service device and use a Bluetooth print profile included in both devices to print a document at the service device. The Bluetooth print profile provides a standard method for printing without requiring the user device to include a print driver and other access information specific to the service device.

The second way for the user device to access the service device is to indirectly connect or link with the service device. Continuing the Bluetooth example, the user device wirelessly links with a Bluetooth router or access point. The access point, in turn, is connected to one or more devices, including the service device, via a local area network (LAN). In order for the user device to print at the service device, the user device is required to have the appropriate LAN protocol stack (e.g., TCP/IP), ability to access the print server, and have a specific print driver for the service device. Thus, the user device initiates printing in much the same way as a computer connected to the LAN.

Figure 1:
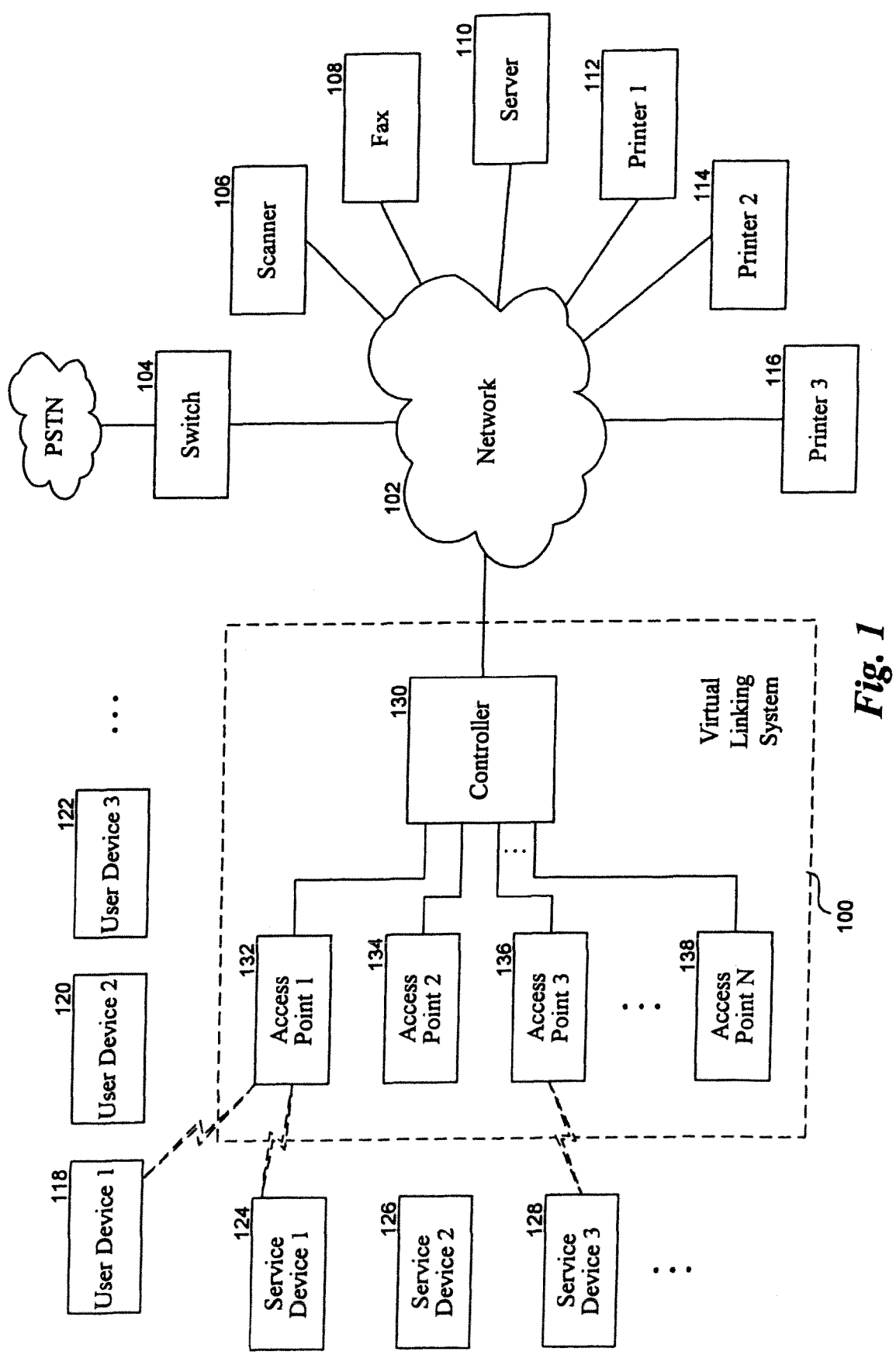
FIG. 1 is a block diagram illustrating one embodiment of a virtual linking system.

In the drawings, identical reference numbers identify identical or substantially similar elements or acts. To easily identify the discussion of any particular element or act, the most significant digit or digits in a reference number refers to the figure number in which that element is first introduced (e.g., element 1104 is first introduced and discussed with respect to FIG. 11).

The headings provided herein are for convenience only and do not necessarily affect the scope or meaning of the claimed invention.

DETAILED DESCRIPTION

Indirect connection, as noted above, is useful when the user and service devices are not within proximity of one another. Due to power, bandwidth, memory, and/or cost constraints, the range for devices to affect direct connection is typically limited. Under the Bluetooth wireless standard, the normal operating range is approximately 10 meters.

However, one of the disadvantages of indirect connection is that the user device is unable to utilize the built-in Bluetooth protocol, e.g., the Bluetooth print profile, to simply print over the LAN. Instead, the user device is required to have the appropriate LAN protocol, print drivers, and other access information specific to all the service devices it may wish to access in order to access services available from any of such service devices. For example, if the user device wishes to print to a first service device (a laser printer) and a second service device (an inkjet printer), the user device is required to have installed the specific print driver for each printer and the protocol suite for the print server.

Since the user device is often a device with limited capacity for mobility purposes, it is restrictive and impractical to use up the limited resources of the user device with installation of various print drivers and other information specific to each potential service device. Moreover, LAN printing can have further complications in that it is difficult to locate an appropriate printer in a large LAN, because preconfiguration, while suitable when the user device is located at a fixed position, is not practical when the user device moves from one location to another. Various other problems exist with current systems beyond these noted above.

In general, for two devices to communicate with each other, an initialization procedure takes place to create an authorized connection or link. This linking, also referred to as pairing, is established between two devices that are both using the same protocol and before the two devices can communicate, e.g., exchange voice or data information, with each other. When at least one of the devices is a wireless device, such a link is not maintained continuously. Instead, the wireless device links with a desired device when it is able to do so, e.g., the wireless device is within range of the desired device, and when it wishes to access services available at the desired device. As such, the wireless device may reestablish a link with the same device a multiple number of times, if, for example, the wireless device is mobile and it moves in and out of the coverage area of the desired device.

Described in detail below is a system and method for providing virtual linking between a wireless device and one or more devices having a similar or dissimilar protocol(s) as the wireless device. Devices that may be out of range for direct linking with the wireless device, devices which may not be accessible due to incompatible access information, and devices which are directly accessible are collectively presented to the wireless device as virtual accessible devices. The wireless device perceives all such devices as being readily accessible using its default wireless protocol. Hence, the wireless device need not have installed other protocols, drivers, access information, etc. to link with certain of the virtual accessible devices.

In one embodiment, virtual linking provides intelligent access to the virtual accessible devices. Rather than presenting a large number of devices based on requested service capability alone, a smaller number of devices based on a filtering scheme is presented to the user of the wireless device. The filtering scheme takes into account factors such as the user's access or permission profile, the wireless device's capability, the wireless device's location, and the accessible devices' locations.

Accordingly, virtual linking extends services and devices available to the wireless device, beyond its wireless protocol limitations, by providing virtual extension of the wireless coverage range and virtual compatibility with non-identical protocols. At the same time, suggestions and choices of virtual accessible devices that the wireless device may virtually link with are provided in accordance with security, ease of use, and other considerations.

The following description provides specific details for a thorough understanding of, and enabling description for, embodiments of the invention. However, one skilled in the art will understand that the invention may be practiced without these details. In other instances, well-known structures and functions have not been shown or described in detail to avoid unnecessarily obscuring the description of embodiments of the invention.

Representative System

Referring to FIG. 1, a block diagram of one embodiment of a virtual linking system 100 is shown. The virtual linking system 100 is coupled to a network 102. The network 102 is coupled to a variety of network devices, including, but not limited to, a network element such as a router or switch 104, a scanner 106, a facsimile machine 108, a server 110, a first printer 112, a second printer 114, and a third printer 116. The virtual linking system 100 is also in communication with one or more wireless devices, including, but not limited to, first, second, and third user devices 118, 120 and 122, respectively, and first, second, and third service devices 124, 126 and 128, respectively.

The virtual linking system 100 is configured to provide a transparent virtual linking service and/or a non-transparent virtual linking service, as described in detail below. The transparent virtual linking service comprises utilizing the virtual linking system 100 to extend the communication range and/or number of links between wireless devices having the same protocol. The non-transparent virtual linking service comprises utilizing the virtual linking system 100 to permit wireless and network devices having same or dissimilar protocols to communicate with each other. In both services, the virtual linking system 100 functions as an intelligent mediation layer such that the wireless devices can utilize their built-in wireless protocol without modification.

The virtual linking system 100, also referred to as an access point network (APN), includes a controller 130 and one or more access points, such as, a first access point 132, a second access point 134, a third access point 136, and an Nth access point 138. Each of the access points 132-138 is coupled to the controller 130. It should be understood that FIG. 1 is not drawn to scale and the physical locations and distribution of the access points 132-138 relative to the controller 130, the network 102, and devices 104-116 may be varied in accordance with the desired coverage area, number of service devices, physical environment, etc.

Figure 2:
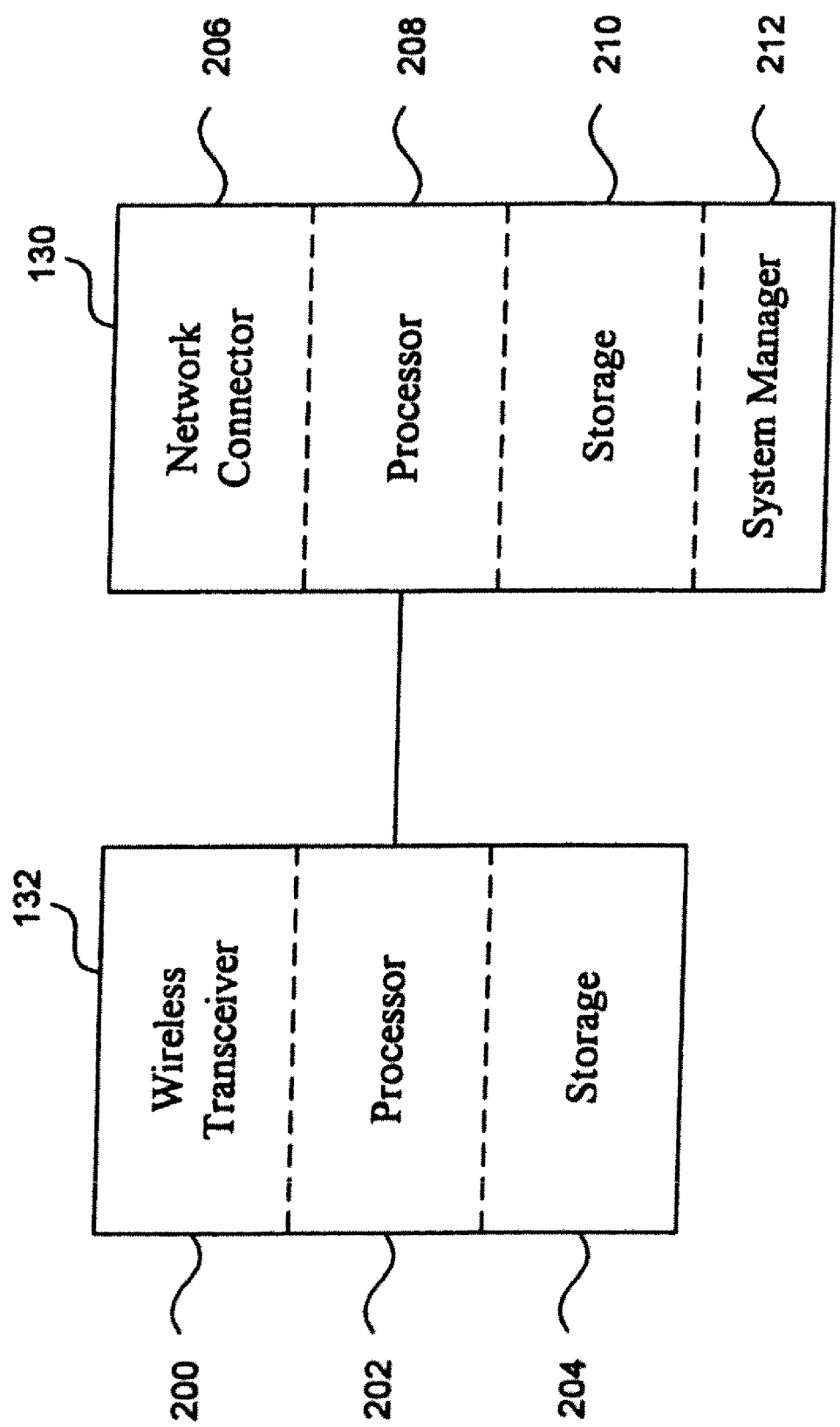
FIG. 2 is a block diagram illustrating an access point and a controller included in the system of FIG. 1.

The access points 132-138, also referred to as access point gateways or base stations, are configured to receive and transmit information to and from one or more of the wireless devices. The virtual linking system 100 can include one or more access points. The number of access points depends upon the size of the coverage area, number of wireless devices, location of the wireless devices, etc. Referring to FIG. 2, a representative access point, e.g., the first access point 132, is shown. The first access point 132 includes a processor 202 coupled to each of a wireless transceiver 200 and a storage 204. The wireless transceiver 200 is configured to operate in the same frequency range as the wireless devices. For example, the wireless transceiver 200 may be a radio frequency (RF) transceiver. The wireless transceiver 200 may comprise more than one wireless transceiver and operate using different wireless technologies, e.g., one of the wireless transceiver may use Bluetooth technology and another of the wireless transceiver may use 802.11a technology.

The access points 132-138 are configured to provide general connectivity of the wireless device to the network 102 and/or resources attached to the network. Alternatively, this functionality is not required for implementation of the virtual linking system 100.

The processor 202 can be one or more processors. The storage 204 can include any type of computer-readable media that can store data accessible by the processor 202, such as a magnetic hard and floppy disk drives, optical disk drives, magnetic cassettes, tape drives, flash memory cards, digital video disks (DVDs), Bernoulli cartridges, RAMs, ROMs, smart cards, or any medium for storing or transmitting computer-readable instructions and data.

The controller 130, also referred to as an access point network controller, is configured to manage the access points, wired and wireless devices, and/or the users of the wireless devices. As shown in FIG. 2, the controller 130 includes a processor 208 coupled to each of a network connector 206, a storage 210, and a system manager 212. The network connector 206, also referred to as communication facilities, comprises communication interfaces for the controller 130 to connect to the network 102. The network connector 206 can include an Ethernet, dial-up modem, wireless modem port, and/or other facilities for interfacing with the network 102, as those skilled in the art will appreciate. Although not shown, the controller 130 may also include an input device, output device, and/or other user interface components.

Although only one controller is shown in FIG. 1 more than one controller may be included in the virtual linking system 100. The functions of the controller 130 may be performed by a number of distributed controllers. For example, a controller may be provided for each access point. The access points may perform the controller functions such that a separate controller is not necessary. In this instance, the access points would be coupled to each other and the network 102. The controller 130 may also be coupled to the access points 132-138 via the network 102. Accordingly, the controller 130 can be located proximate or remote to the access points 132-138.

The network 102 is a communications network, such as a local area network (LAN), a wide area network (WAN), or the Internet. When the network 102 is a public network, security features (e.g., VPN/SSL secure transport) are included to ensure authorized access to the network.

The network devices are distributed throughout a building, facility, or a given environment. The network devices compose a variety of devices for facilitating communication, storage, distribution, access, processing, etc. of information between groups, individuals, or locations served by the network 102. For example, when the network 102 is a corporate LAN, the network devices may comprise computers, fax machines, laser printers, inkjet printers, color printers, switches, servers, scanners, routers, etc. A network device, such as the switch 104, may be coupled to yet another network, such as a public switched telephone network (PSTN). The switch 104 and the server 110 may be located at an administration site, the printer 112 may be located at a common area of a building, the printer 114 may be located at an individual's office within the building, and the printer 116 may be located at another individual's office with the building.

The devices 118-128, also referred to as mobile units, are wireless devices including the same wireless protocol and which are configured to communicate with each other and the access points 132-138 using the wireless protocol. The devices 118-128 comprise a wide variety of device types, such as personal computers, cordless telephones, headsets, printers, personal digital assistants (PDAs), etc. Each of the user devices 118-122 can be the same type of device as each of the service devices 124-128. The user devices 118-122 are wireless devices that initiate or request a link with one or more of the service devices 124-128 or the network devices 104-116. There can be more or less wireless devices then is illustrated in FIG. 1. The devices 118-128 are distributed within a building, facility, or given environment. The user devices 118-122 are likely to move around relative to the virtual linking system 100, the network 102, the network devices, and/or the service devices 124-128.

Figure 3:
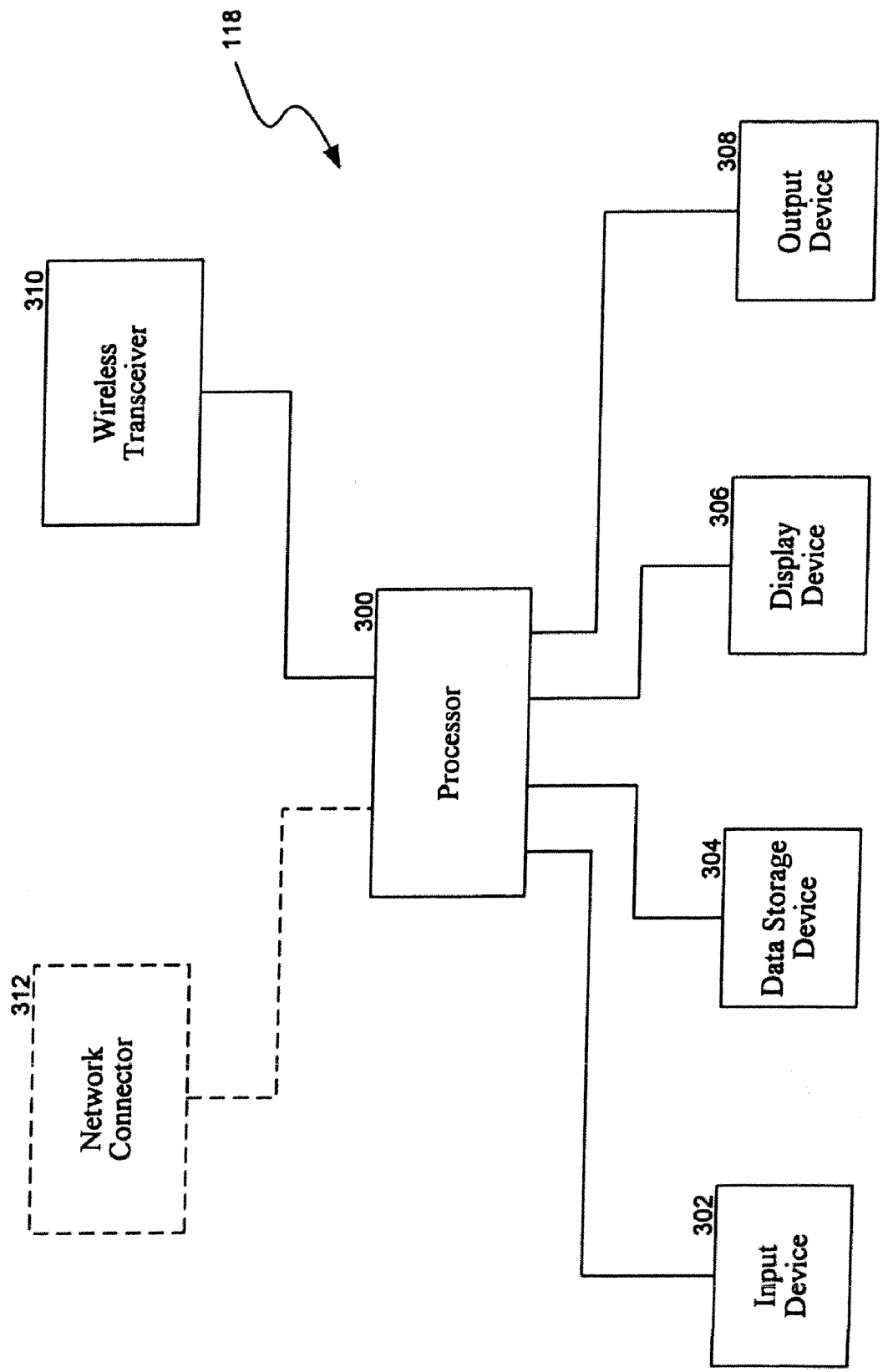
FIG. 3 is a block diagram of a wireless device or resource suitable for interacting with the system of FIG. 1.

Referring to FIG. 3, there is shown a more detailed block diagram of the first user device 118. For illustration purposes only, FIG. 3 will be discussed with respect to the first user device 118, although it should be understood that the first user device of FIG. 3 is representative of the devices 120-128 and the network devices. The first user device 118 includes each of an input device 302, a data storage device 304, a display device 306, an output device 308, a wireless transceiver 310, and a network connection 312 coupled to a processor 300. At least one of the input device 302, display device 306, output device 308, wireless transceiver 310, and network connector 312 may be optional depending on the device type of the first user device 118. For example, if the first user device 118 is a PDA, the display device 306 may be a touch screen, the input device may be a stylus, but an additional output device may not be included.

The processor 300 is configured to manage data, transmissions, and other activities within the first user device 118. The processor 300 includes an operating system, applications, plug-ins, a wireless protocol stack, etc. in the form of firmware or software. For example, if the first user device 118 is a PDA, the processor 300 can include the palm operating system, productivity applications, and the Bluetooth protocol stack.

The input device 302 may include a keyboard and/or a pointing device such as a mouse. Other input devices such as a microphone, joystick, pen, stylus, scanner, digital camera, video camera, and the like are possible. The data storage device 304 may include any type of computer-readable media that can store data accessible by the processor 300.

The display device 306 may comprise a liquid crystal display (LCD), a plasma display, a touch screen, one or more light emitting diodes (LEDs), and the like. The output device 308 may comprise speakers, tactile or olfactory output devices, printers, etc.

The wireless transceiver 310 is configured to be compatible with the wireless transceiver included in the access points. Although not shown, the wireless transceiver 310 can include one or more antennas, coders, decoders, analog-to-digital (A/D) converters, D/A converters, amplifiers, etc. relating to transmission and receipt of wireless signals. The network connector 312 comprises communication interfaces for the processor 300 to connect to the network 102.

The discussion herein provides a brief, general description of a suitable computing environment in which aspects of the invention can be implemented. Although not required, aspects and embodiments of the invention will be described in the general context of computer-executable instructions, such as routines executed by a general-purpose computer. Those skilled in the relevant art will appreciate that aspects of the invention can be practiced with other system configurations. Aspects of the invention can be embodied in a special purpose computer or data processor that is specifically programmed, configured or constructed to perform one or more of the computer-executable instructions explained in detail below. Indeed, the term "computer," as used generally herein, refers to any of the above devices as well as to any data processor.

Aspects of the invention can also be practiced in distributed computing environments where tasks or modules are performed by remote processing devices and which are linked through a communications network, such as a LAN, WAN, or the Internet. In a distributed computing environment, program modules or sub-routines may be located in both local and remote storage devices. Aspects of the invention described herein may be stored or distributed on computer-readable media, including magnetic and optically readable and removable computer disks stored as firmware in chips (e.g., EEPROM chips), as well as distributed electronically over the Internet or other networks. Those skilled in the relevant art will recognize that portions of the invention may reside on a server computer, while corresponding portions reside on a client computer. Data structures and transmission of data particular to aspects of the invention are also encompassed within the scope of the invention.

Aspects of the invention are described in detail below with respect to the Bluetooth specification. Bluetooth refers to a specification configured to standardize wireless transmission between a wide variety of devices, such as computers, cordless telephones, headsets, printers, PDAs, etc. Bluetooth acts as a "virtual cable," whereby a computer can automatically use a mobile telecommunications device (such as a cell phone) to send data wirelessly, such as exchange e-mails, transmit data to a fax machine, etc. Bluetooth operates in the unlicensed 2.4 GHz spectrum using frequency-hopping spread spectrum, where data packets are spread across the Bluetooth spectrum at a nominal rate of 1,600 hops per second to lessen interference and fading. According to the Bluetooth specification, Bluetooth devices operate their antennas at one of three different maximum antenna power levels, i.e., 1 W, 2.5 mW, and 100 mW. The nominal link range is 10 meters and the gross data rate is 1 Mbps. Bluetooth supports both synchronous connection oriented (SCO) links for voice and asynchronous connections (ACL) for packet data.

It should be understood that the invention is described below with respect to the Bluetooth specification for illustration purposes only. Other wireless communication specifications may be practiced with one or more embodiments of the invention, such as IEEE 802.11, HomeRF, IRDA, etc.

Representative Implementation

Figure 4:
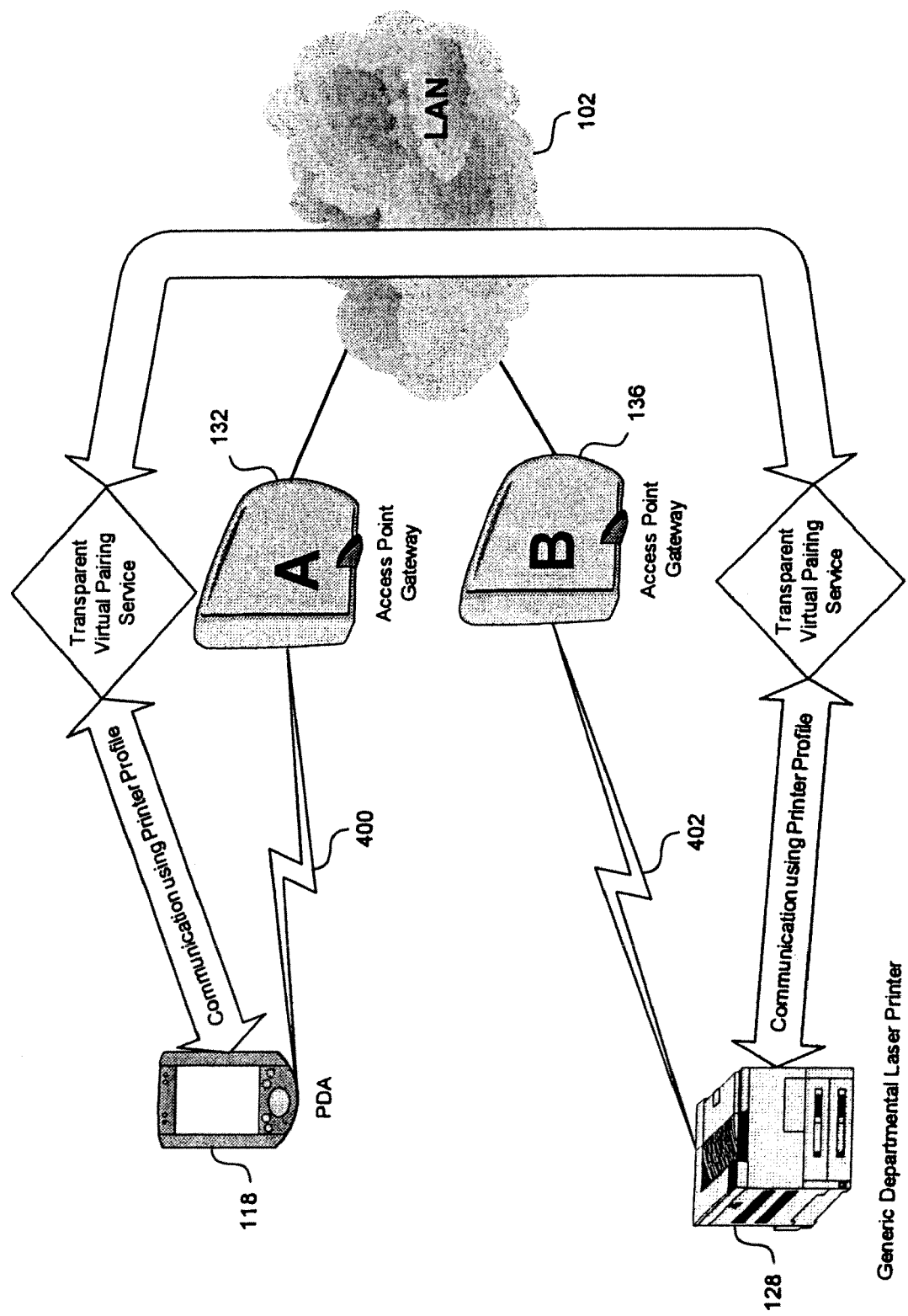
FIG. 4 is a block diagram illustrating a transparent virtual linking service provided by the system of FIG. 1.

Referring to FIG. 4, an example of the transparent virtual linking service provided by the virtual linking system 100 is illustrated. The first user device 118 (e.g., a Bluetooth enabled PDA) is virtually linked to the service device 128 (e.g., a Bluetooth enabled laser printer) via the access points 132 and 136. A Bluetooth link 400 is established between the device 118 and the access point 132. A Bluetooth link 402 is established between the device 128 and the access point 136. The device 118 prints to the device 128 utilizing a Bluetooth print profile included in each of the devices 118 and 128 and the access points 132 and 136. The access points 132 and 136 extend the communication range between the devices 118 and 128 beyond the nominal 10 meter range set by the Bluetooth specification. Accordingly, the device 118 and the access point 132 are within 10 meters of each other and the device 128 and the access point 136 are within 10 meters of each other, but the devices 118 and 128 can be more than 10 meters apart.

Alternatively, a single access point, e.g., access point 132, may serve as the conduit between the devices 118 and 128. In this case, both the devices 118 and 128 would be within the nominal communication range of the access point 132.

Figure 5:
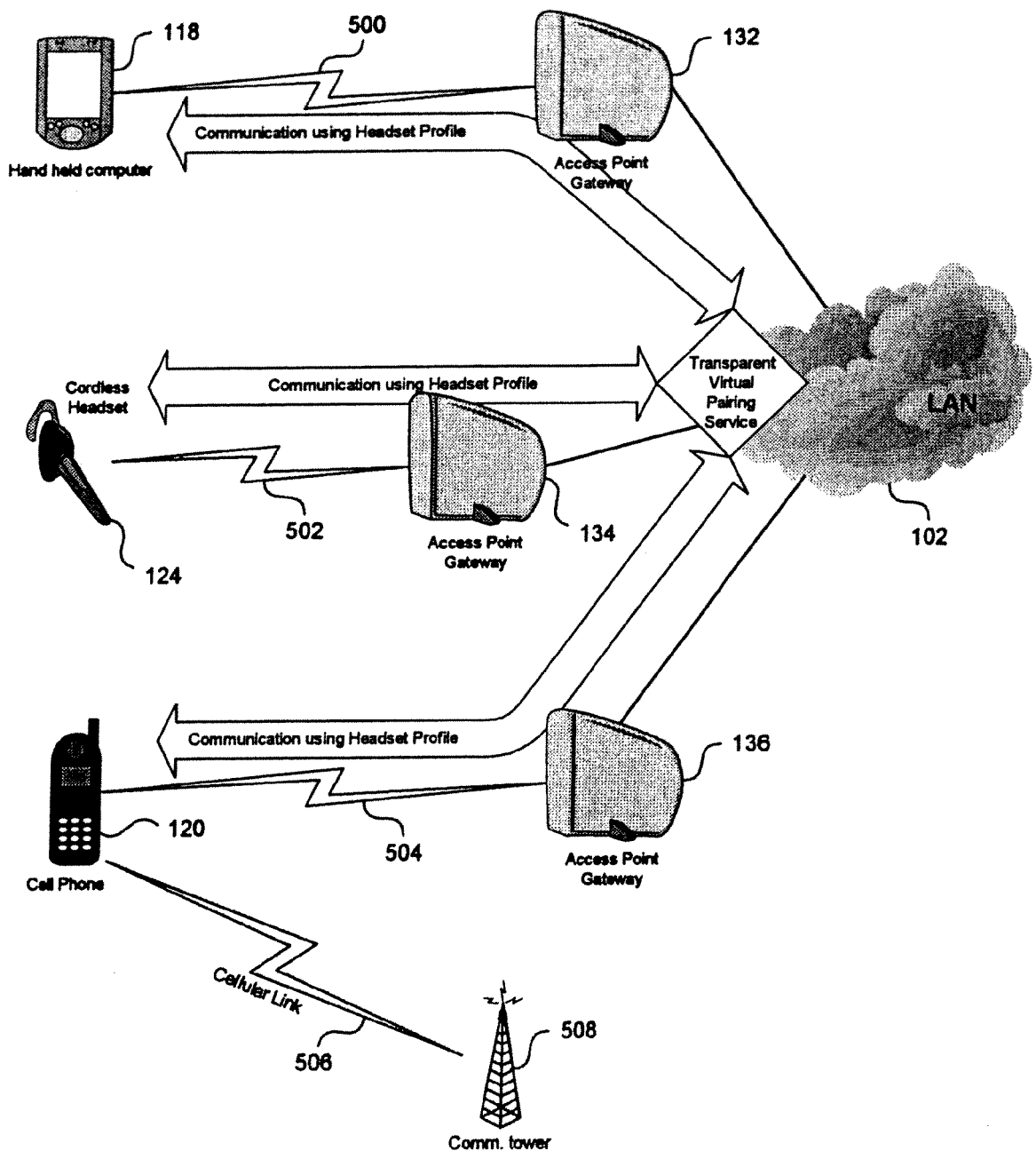
FIG. 5 is another block diagram illustrating the transparent virtual linking service provided by the system of FIG. 1.

Referring to FIG. 5, another example of the transparent virtual linking service provided by the virtual linking system 100 is illustrated. The first user device 118 (e.g., a Bluetooth enabled PDA) and the second user device 120 (e.g., a Bluetooth enabled cell phone) are virtually linked to the first service device 124 via the access points 132, 134, 136. Bluetooth links 500, 502 and 504 are respectively established between the device 118 and the access point 132, between the device 124 and the access point 134, and between the device 120 and the access point 136. The cordless headset provides cordless audio services (e.g., microphone and speaker functions) to both of the devices 118 and 120 utilizing a Bluetooth headset profile included in each of the devices 118, 120, 124 and the access points 132, 134, 136.

Current cordless headsets can only link with a single device. With the transparent virtual linking service, the cordless headset can virtually link with more than one device. Such virtual linking is possible even if one or more of the devices 118, 120, 124 is beyond the nominal Bluetooth range with each other. As shown in FIG. 5, the transparent virtual link allows a user to have hands-free cell phone capabilities and also remotely interact with the PDA, for example, to dictate without having the PDA being within recording distance. The devices 118, 120, 124 may be virtually linked to the same access point rather than to different access points as shown in FIG. 5.

Figure 6:
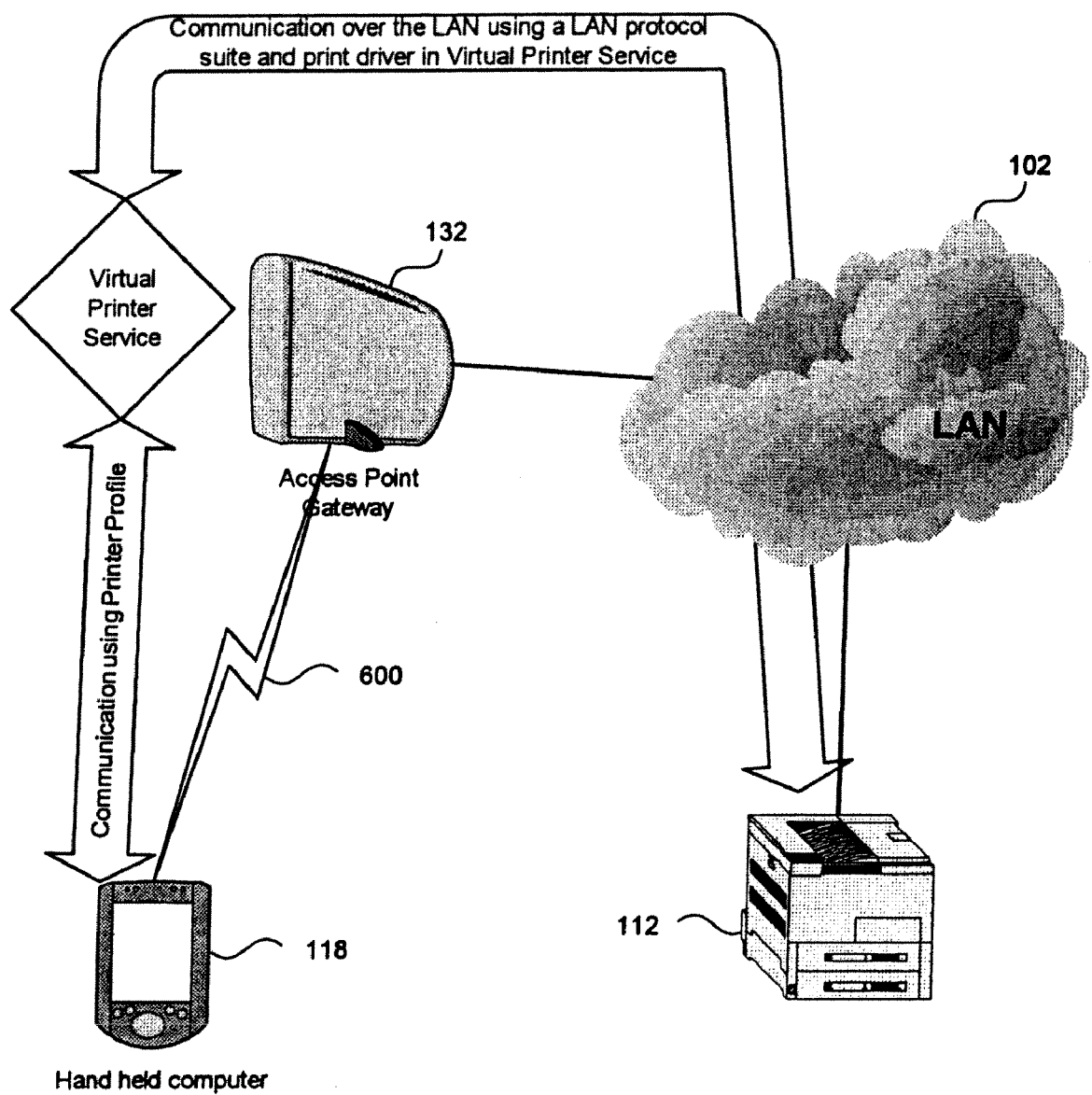
FIG. 6 is a block diagram illustrating a non-transparent virtual linking service provided by the system of FIG. 1.

Referring to FIG. 6, an example of the non-transparent virtual linking service provided by the virtual linking system 100 is illustrated. The first device 118 (e.g., a Bluetooth enabled PDA) is virtually linked to the first printer 112 (e.g., a network laser printer) via the access point 132. A Bluetooth link 600 is established between the device 118 and the access point 132. The PDA communicates printing instructions and data to the access point 132 using a Bluetooth printer profile include in the PDA and the access point 132. The access point 132 configures the received printing instructions and data into a suitable format for the network laser printer, which is not Bluetooth enabled. A LAN protocol suite and print driver specific to the network laser printer are utilized within the access point 132 to complete the print request to the network laser printer.

Figure 7:
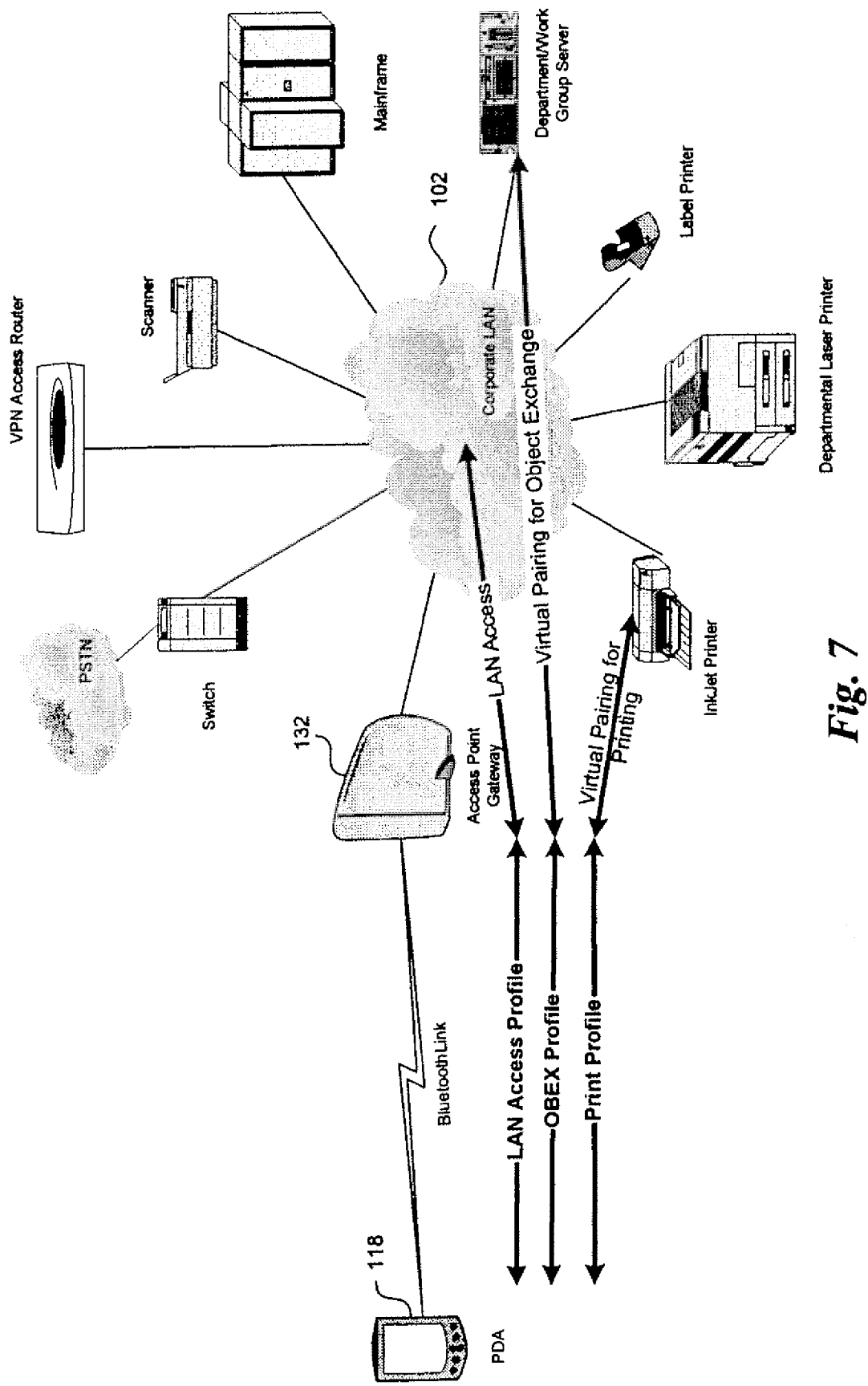
FIG. 7 is another block diagram illustrating the non-transparent virtual linking service provided by the system of FIG. 1.

The device 118 utilizing various profiles included in the Bluetooth specification can similarly access other resources or devices connected to the network 102. For example, FIG. 7 shows the PDA (device 118) virtually linked with the access point 132 to access the network 102, a server, and an inkjet printer using a LAN access profile, an object exchange (OBEX) profile, and a print profile, respectively. The PDA may use the general LAN access profile to browse the Internet, the OBEX profile to synchronize its calendar and address book, and the print profile to print to printers.

In another example, services offered by resources and services reported to the user devices need not be identical. A network attached fax machine may be presented to a user device as a printer. A network attached storage device (which looks like a file system) may be presented to a user device using the OBEX profile. A Bluetooth enabled PDA using an OBEX profile could be virtually linked to the print profile of a Bluetooth enabled printer (i.e., using the non-transparent virtual linking service to link two Bluetooth devices that do not share a common profile).

In still another example, the user device 118 can be virtually linked using the non-transparent virtual linking service to the service device 128 (see FIG. 1). The user device 118 uses the Bluetooth protocol but the service device 128 uses a different wireless protocol technology, or both devices are Bluetooth enabled but one of the devices does not have the necessary profiles in common with the other device.

In the above illustrations, the functions of the controller 130 are included in the access points. With transparent and non-transparent virtual linking services, the devices are not aware that they may be linked with a Bluetooth device that is out of the nominal Bluetooth range, a non-Bluetooth enabled device, or a dissimilar Bluetooth device (e.g., a Bluetooth device that does not have the necessary profiles in common with the initiating device). The network devices are also unaware that the user device (e.g., a Bluetooth device) is different from other network devices. In the transparent virtual linking service, translation or interpretation of the link stream is not required. In the non-transparent virtual linking service, translation is required to take into account dissimilar profiles between the initiating device and the resource device.

As the user device moves out of range of a given access point, a hand-off to another access point occurs so that the virtual link and communication with the service or network device(s) can be maintained.

Figure 8:
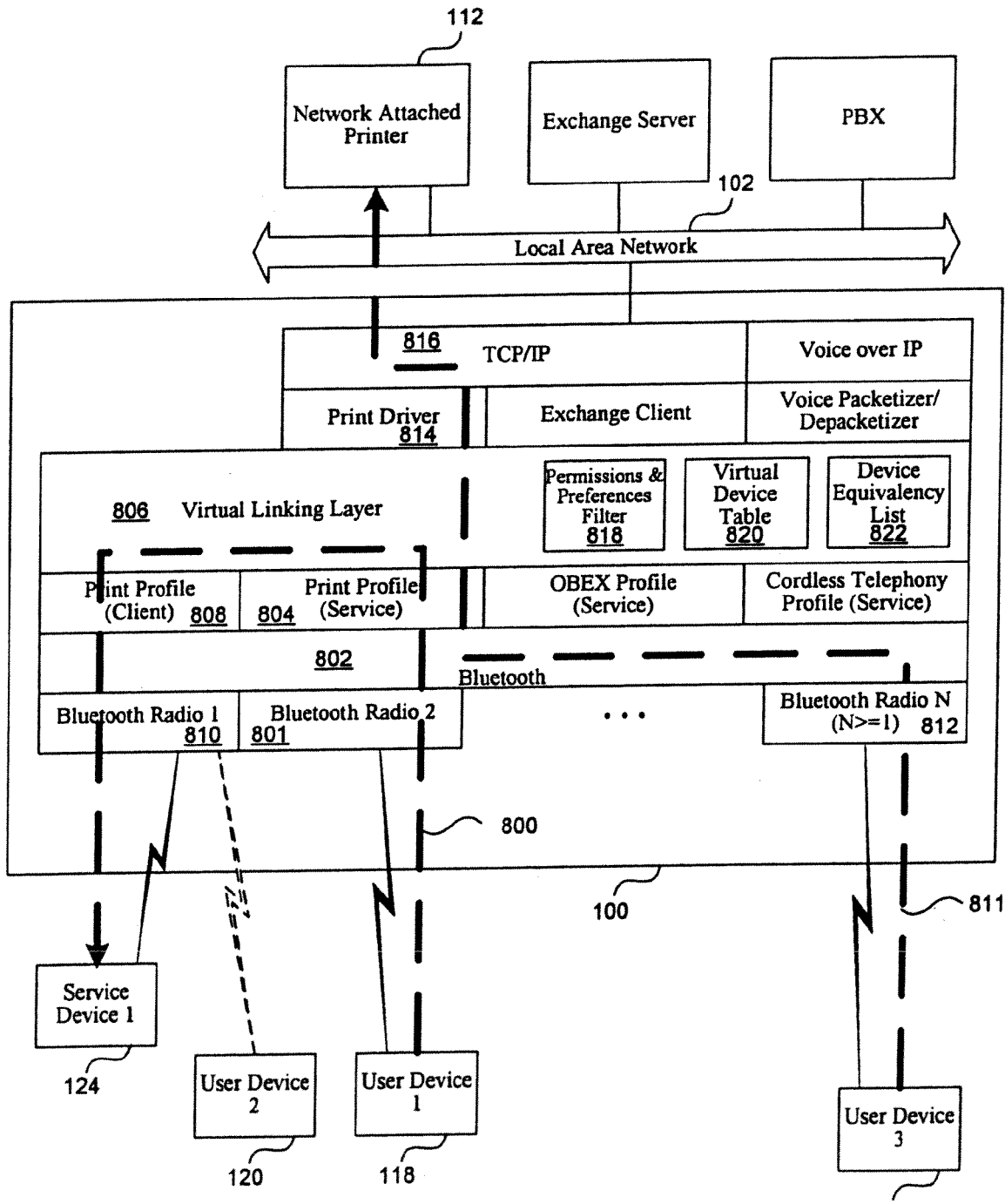
FIG. 8 is a logic block diagram of the link streams or pathways through the protocol included in the system of FIG. 1.
Figure 9:
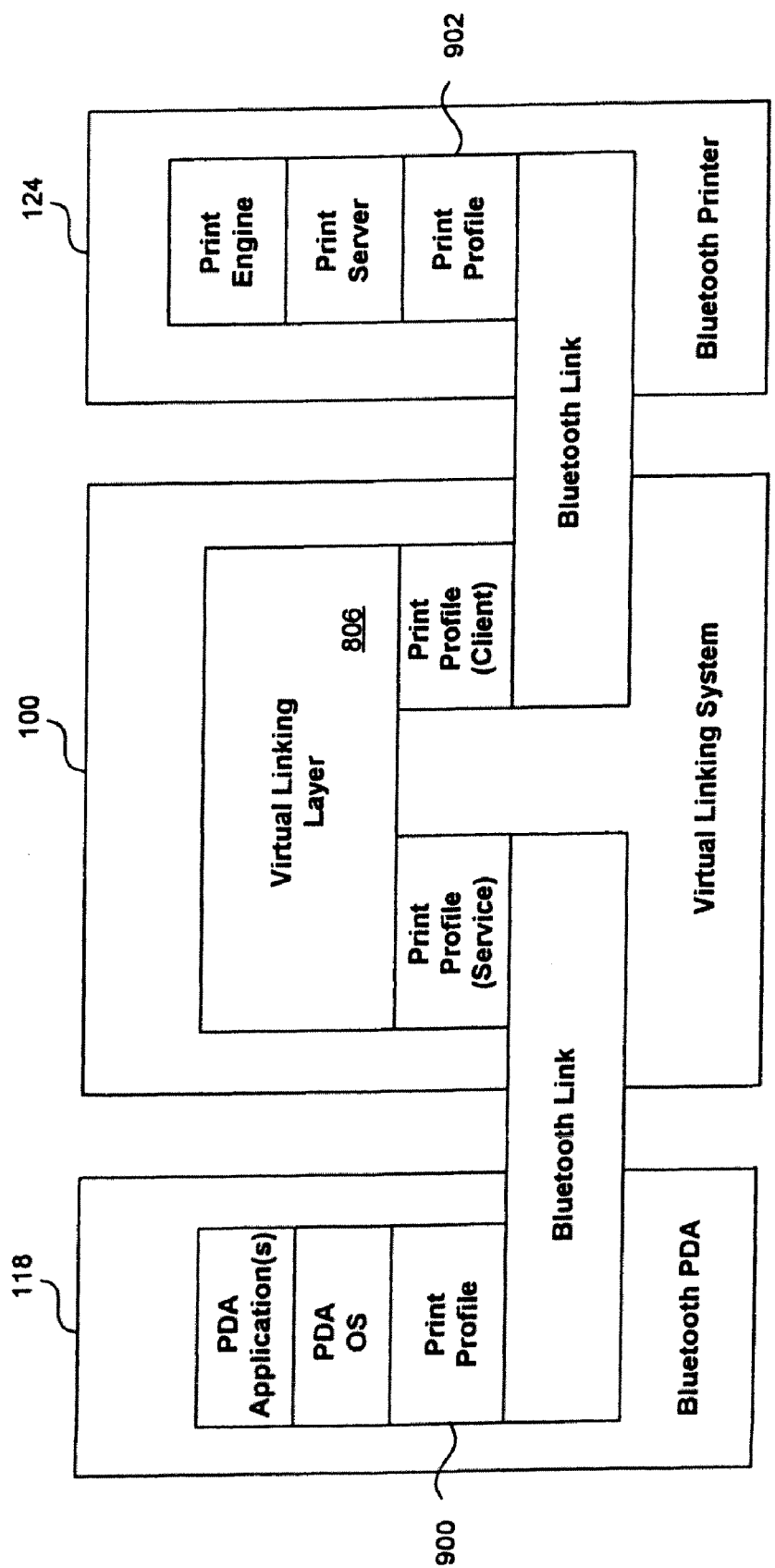
FIG. 9 is an example of a logic block diagram showing the protocols and profiles involved in the transparent virtual linking service.
Figure 10:
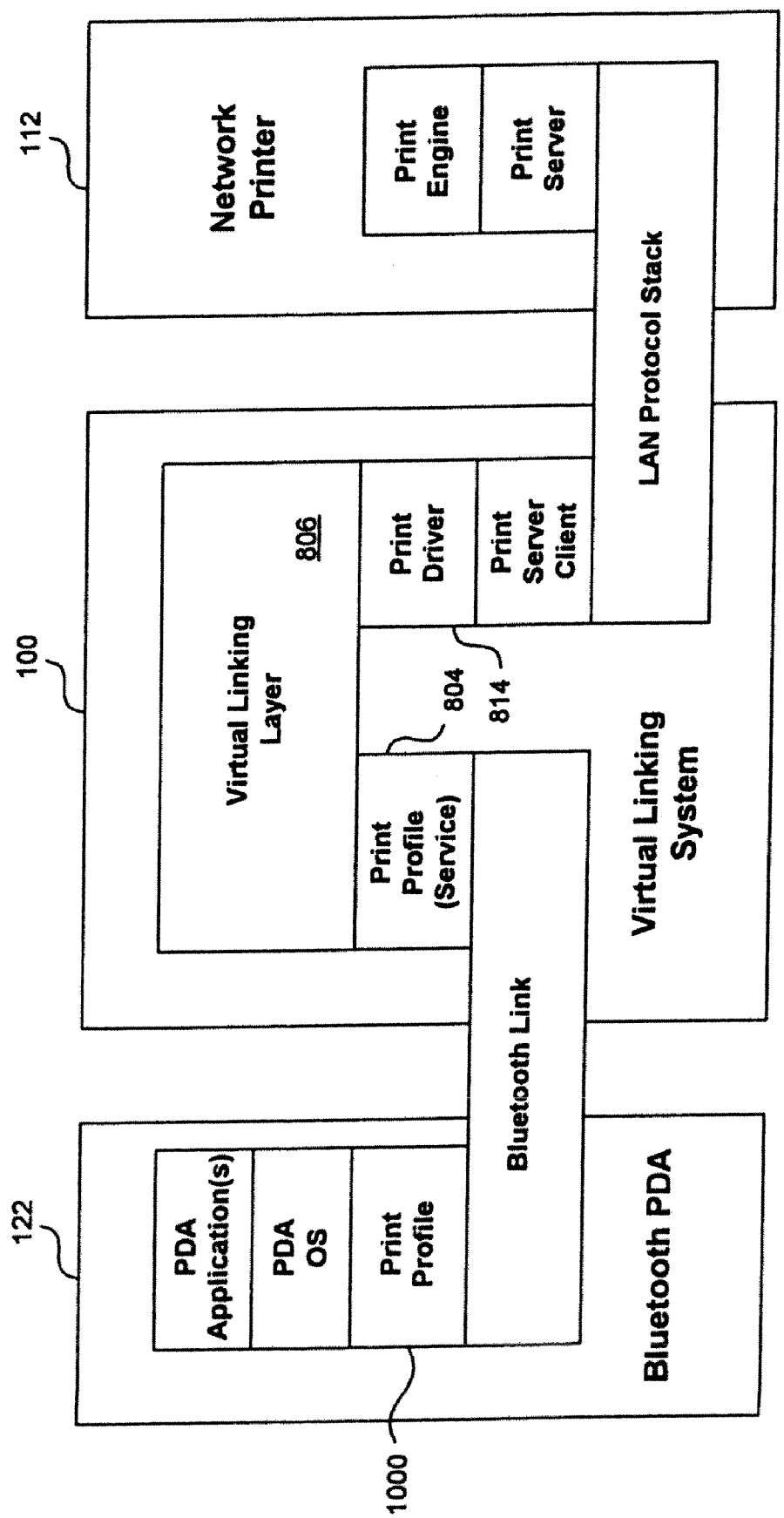
FIG. 10 is an example of a logic block diagram showing the protocols and profiles involved in the non-transparent virtual linking service.

Referring to FIGS. 8-10, logic block diagrams show the profiles and protocol layers involved in transparent and non-transparent virtual linking. The link streams or pathways for a user device to print to a service device or a network device are illustrated. A link stream or pathway 800 pertains to a transparent virtual link between the first user device 118 and the first service device 124. Within the virtual linking system 100, the link stream 800 is through a Bluetooth radio layer 801, a Bluetooth link layer 802, a service print profile layer 804, a virtual linking layer 806, a client or user print profile layer 808, the Bluetooth link layer 802, and lastly a Bluetooth radio layer 810.

Profiles and protocol layers that can be included in the devices 118 and 124 are shown in FIG. 9. In FIG. 9, the first user device 118 is a Bluetooth enabled PDA and the first service device 124 is a Bluetooth enabled printer. The first user device 118 includes a Bluetooth print profile layer 900 similar to a Bluetooth print profile layer 902 included in the first service device 124.

A link stream or pathway 811 pertains to a non-transparent virtual link between the third user device 122 and the network printer 112 (FIG. 8). Within the virtual linking system 100, the link stream 811 is through a Bluetooth radio layer 812, the Bluetooth link layer 802, the service print profile layer 804, the virtual linking layer 806, a print driver 814, and a PCT/IP layer 816. Profiles and protocol layers that can be included in the devices 122 and 112 are shown in FIG. 10. In FIG. 10, the third user device 122 is a Bluetooth enabled PDA and the network printer 112 is a non-Bluetooth enabled printer. The service print profile layer 804, similar to a print profile layer 1000 included in the device 122, and the print driver 814 both included in the system 100 enables the print instructions from the device 122 to be transformed into a format compatible with the network printer 112 (e.g., the TCP/IP layer 816 included in the LAN protocol stack).

Figure 11:
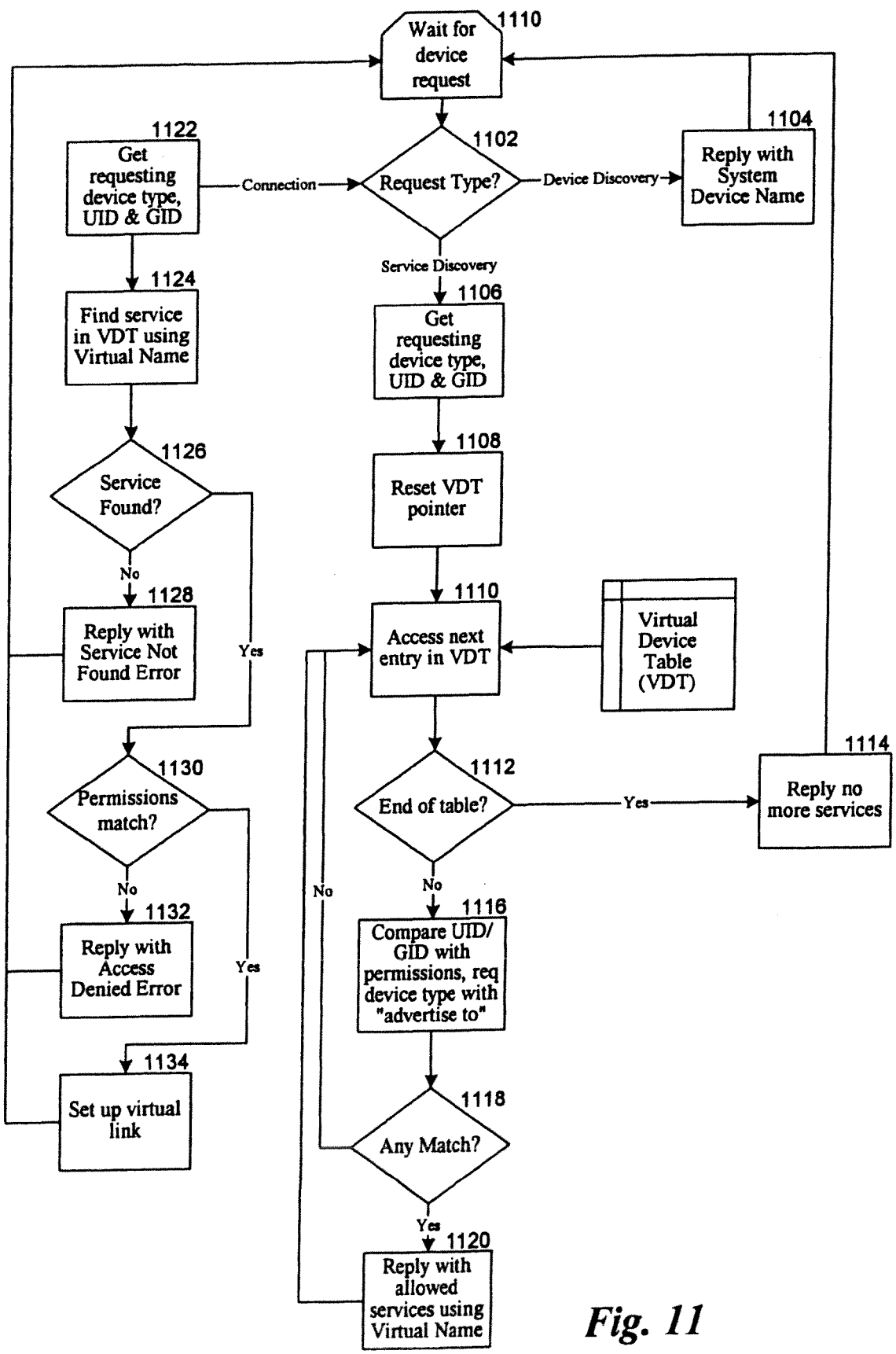
FIG. 11 is a flow diagram of a device discovery, service discovery, and connection request made by the wireless device of FIG. 2.

Before a user device can virtually link or connect with a resource, device discovery and service discovery take place. The flow diagram of FIG. 11 illustrates the process blocks associated with a device discovery, service discovery, and connection request from a user device.

At a block 1100, the virtual linking system 100 waits for a request from a user device. First, a user device initiates a Bluetooth device discovery request. Such a request can be the result of express instructions from a user of that user device or the user device may be set to automatically discover devices according to some preset interval. Upon receiving the request, the virtual linking system 100 examines the request at a block 1102. After determining that it is a device discovery request, the virtual linking system 100 responds with the virtual linking system's device name at a block 1104.

The virtual linking system 100 returns to the block 1100 and awaits another request from the user device. Next, the user device initiates a Bluetooth service discovery request. Such a request is initiated as a result of a device discovery response or by the user wishing to access a service that a discovered device may be able to offer. Upon receipt of the request, the type of request is determined at the block 1102. At a block 1106, the user device is queried for information against which the results later returned to the user device can be filtered. This information would include a user identification (UID) and a user group identification (GID), as well as other details such as the present location of the user device. The UID is a unique identifier associated with the user (e.g., login name) and the GID is a group within which the user belongs to (e.g., a certain workgroup, a visitor, etc.).

Figure 12:
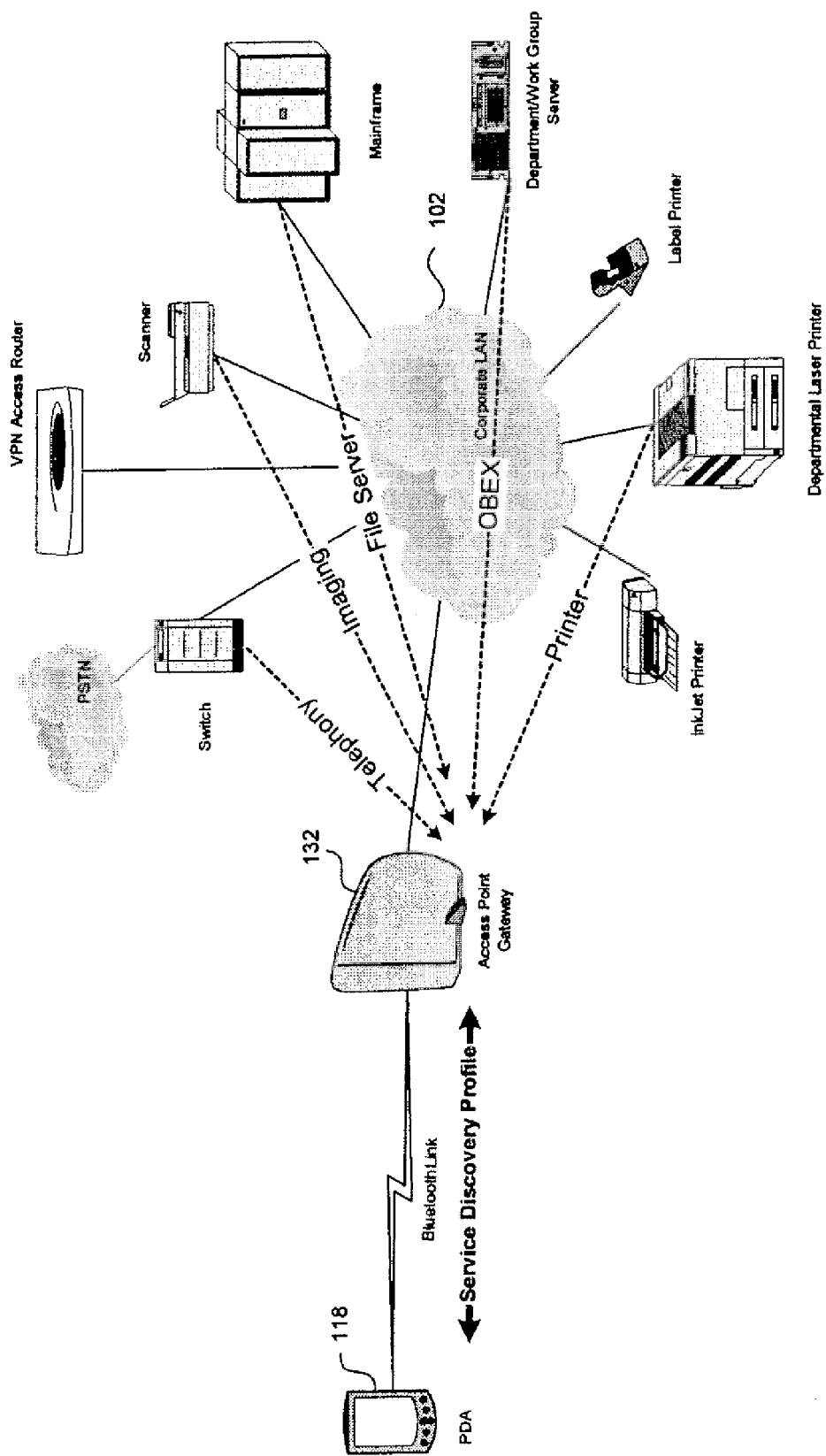
FIG. 12 is a block diagram illustrating the service discovery request of FIG. 11.

Service discovery is a way to describe functions required by the user device and functions provided by the discovered device(s) that the user expressed interest in (the potential service devices). In transparent virtual linking, the service discovery is provided by the same service discovery profile included in both the user device and each of the potential service devices. As such, a transparent relay of the service discovery request and response between the devices are implemented. In non-transparent virtual linking, the service discovery profile of the user device and the potential service devices may not be the same. The virtual linking system 100 performs a translation or mediation between the service discovery profile of the user device and that of the potential service devices (for example, see FIG. 12). The virtual linking system 100 may alternatively mediate the connection (e.g., MAC layer, network layer, session layer, application layer, etc.) rather than the service discovery protocol.

Since the system 100 increases the coverage area and number of devices that can operate within the coverage area, especially in the case of non-transparent virtual linking service, a cache list of virtual devices that are discoverable is maintained in the system. This list, referred to as a virtual device table (VDT) 820, is provided within the virtual linking layer 806 (see FIG. 8). The VDT 820 is continually or periodically updated to reflect all resources available to the system 100. The system 100 can independently perform device and service discovery for purposes of creating and maintaining the VDT 820. As described in detail below, the VDT 820 includes information or schema associated with each discoverable device or resource. Since each resource has its own schema, the VDT 820 is the translation of the objects in the service discovery responses for each resource in a single location.

Rather than performing service discovery for each of the potential service devices, e.g., the user device actually querying each potential service device as to whether a particular service is provided, the VDT 820 is utilized in a block 1108. Use of the VDT 820 may be faster than performing standard service discovery. After a VDT pointer has been reset in the block 1108, a first device entry in the VDT 820 is accessed in a block 1110. If the first device entry is the last device entry (i.e., the end of the VDT 820 has been reached with the last device entry being a special NULL entry to explicitly indicate the end of the table) in a block 1112, then an indication that no more services are available is returned in a block 1114. Otherwise, if the end of the VDT 820 has not been reached in the block 1112, then a comparison or a permissions and preferences filter 818 is applied in a block 1116.

The filter 818 is included within the virtual linking layer 806 (see FIG. 8). In the block 1116, the filter 818 first compares the user's UID and GID with a permission list associated with the first device entry of the VDT 820. Then the filter 818 compares the list of the user's preferences (stored either in a separate table or supplied as part of the user authentication and authorization process) with the discovered devices that the user expressed interest in. The suitability of a given potential service device is gauged or filtered in accordance with the user's location, authorization, needs, and other system rules.

In a block 1118, if the first device entry in the VDT 820 survives the comparisons in the block 1116, i.e., the service device satisfies the filter rules, then an indication is returned to the user device of the available service(s) of that service device, e.g., a virtual service name associated with the first device entry is returned to the user device, in a block 1120. Then the VDT pointer is advanced by one and the next device entry in the VDT 820 is accessed in the block 1110. If no match is found in the block 1118, i.e., the service device corresponding to the first device entry is not a suitable service device, then the next device entry in the VDT 820 is accessed in the block 1110.

The blocks 1110-1120 are repeated until all device entries in the VDT 820 have been accessed and compared against the user specified information (as specified in the block 1106) and the filter 818. Each service device that satisfied the filter 818 is "advertised to" or presented to the user (in block 1120) as part of the response to the user's service discovery request.

For example, assume that the service discovery request is for printing services. Then the system 100 may present only the following four printers as available service devices, even though six printers within the coverage area can provide the requested printing services. The four presented printers are: (1) "Color laser"—a Hewlett Packard (HP)-8550 laser jet printer with an integrated print server on the LAN, for printing color and large format documents; (2) "My Printer"—an HP-995c Bluetooth inkjet printer in the user's office, for printing confidential documents; (3) "Photo printer"—an Epson Photo 200P printer attached to a Windows .NET server, for printing archival quality photos; and (4) "The nearest printer"—a Xerox Document Centre 460 ST, a high volume printer in the copy room adjacent to where the user is standing but which is attached to the LAN and does not have Bluetooth connectivity. The two printers that are not presented are: (1) "CEO's printer"—an HP 1100A laser jet printer connected to the LAN and located closer to the user than "The nearest printer," but the user is not authorized to print to this printer because it is located in the CEO's office; and (2) another Xerox Document Centre 460 ST printer that is further away from the user than "The nearest printer."

Once appropriate service devices are presented to the user per the service discovery request, the user can request a connection or virtual link to a particular service device from among the service devices presented, in a block 1102. During the connection request, the user also provides his or her UID and GID information. In response, at a block 1124, the device entry in the VDT 820 corresponding to the user's selection is located.

If the user's selection is located in the VDT 820 (block 1126), then the filter 818 is applied again to confirm that the user has permission rights to connect with the service device in a block 1130. If the permission is confirmed, then in a block 1134, a virtual link is established between the user device and the user selected service device via the system 100.

If the device entry corresponding to the user selected service device cannot be located in the VDT 820, then an error message, such as a "service not found" message, is returned to the user device (block 1128). Similarly, if access is not allowed per the application of the filter 818 in the block 1130, then an error message, such as an "access denied" message, is returned to the user device (block 1132). Accordingly, in these cases, no connection is established between the user device and the user selected service device.

Thus, the transparent and non-transparent virtual linking services provide dynamic and intelligent virtual linking, taking into account factors such as the user's preset access or permission, the user device's capability, and the user's location. The user access or permission list is typically set up by a system administrator to control access to discoverable devices. The access associated with the devices may be controlled for security reasons (e.g., a guest user cannot have access to a server), ease of use (e.g., a user may be presented with "The nearest printer" and "My printer" rather than a list of all available printers), or a variety of other reasons.

The location of the user at the time of the service discovery request is relevant. For example, offering "The nearest printer" would obviously be dependent on where the user is located. A user in the lobby of a building may have restricted access to network resources. It is contemplated that service discovery and connections may be updated as the user moves about the coverage area and as the optimal service devices change accordingly.

The capability of the user device is also a factor in the service devices presented or "advertised to" the user per the service discovery request. For example, there is no point in offering cordless telephony to an MP3 player. As another example, a user device running a Palm operating system may be offered one type of object exchange service devices while a user device running a Windows CE operating system may be offered a different type of object exchange service devices.

Figure 13:
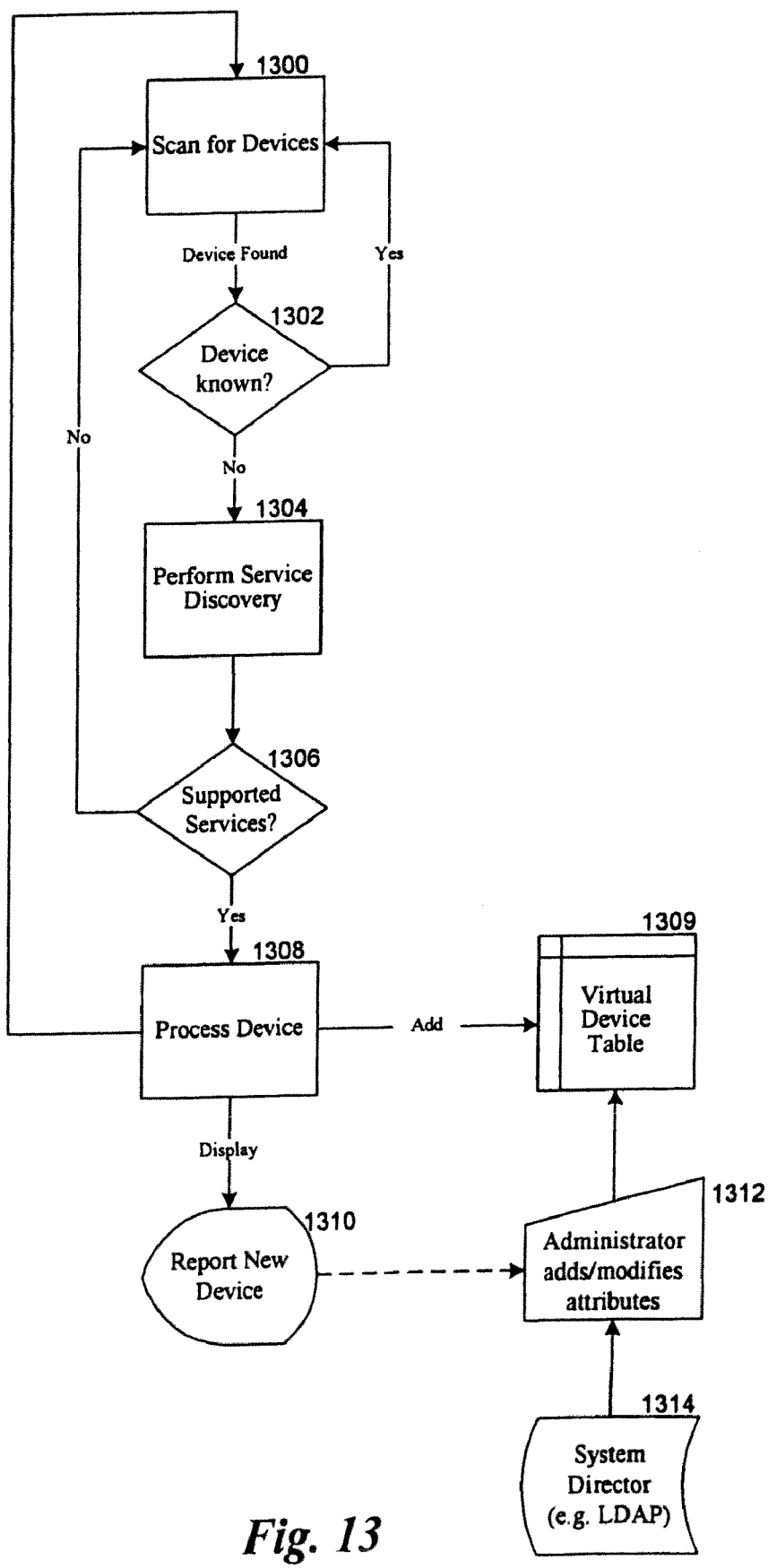
FIG. 13 is a flow diagram illustrating the creation and maintenance of a virtual device table (VDT) shown in FIG. 8.

Referring to FIG. 13, a flow diagram showing the construction and maintenance of the VDT 820 is provided. The controller 130 is configured to initiate device discovery and service discovery for creation and maintenance of the VDT 820 continuously, periodically, upon addition or deletion of a resource, or upon request by a personnel, such as a system administrator. At a block 1300, discoverable devices are sought. At a block 1302, if a given discovered device is already known, i.e., a device entry corresponding to the discovered device already exists in the VDT 820, then the scan for other discoverable devices continues at the block 1300.

On the other hand, if the discovered device is not known, then a service discovery request to query that discovered device occurs at a block 1304. If this discovered device is a supported device (block 1306), then information associated with the device is processed in a block 1308 and added to the VDT 820 in a block 1309. The supported device could be any service or facility accessible by the network, such as a PDA, printer, laptop, scanner, cordless headset, projector, display device, facsimile machine, or any computer output device. If the discovered device is not a supported device (block 1306), then the scan for other discoverable devices continues at the block 1300.

The iterations of the blocks 1300-1306 will be repeated for each discovery protocol known to the virtual linking system 100. Examples of discovery and service protocols included in the virtual linking system 100 can include the Bluetooth device and service discovery protocols, the Universal Plug and Play (UPnP) protocol, and the Salutation protocol.

At a block 1310, a display, report, or other indication is provided to personnel, such as a system administrator, of the newly discovered and supported device. Then the system administrator can add or modify attributes associated with that device in the VDT 820 (block 1312). A system directory (e.g., LDAP) in a block 1314 also contributes to system administrator's contribution in the block 1312 or provide modifications to the VDT 820 without intervention by the system administrator.

Figure 14:
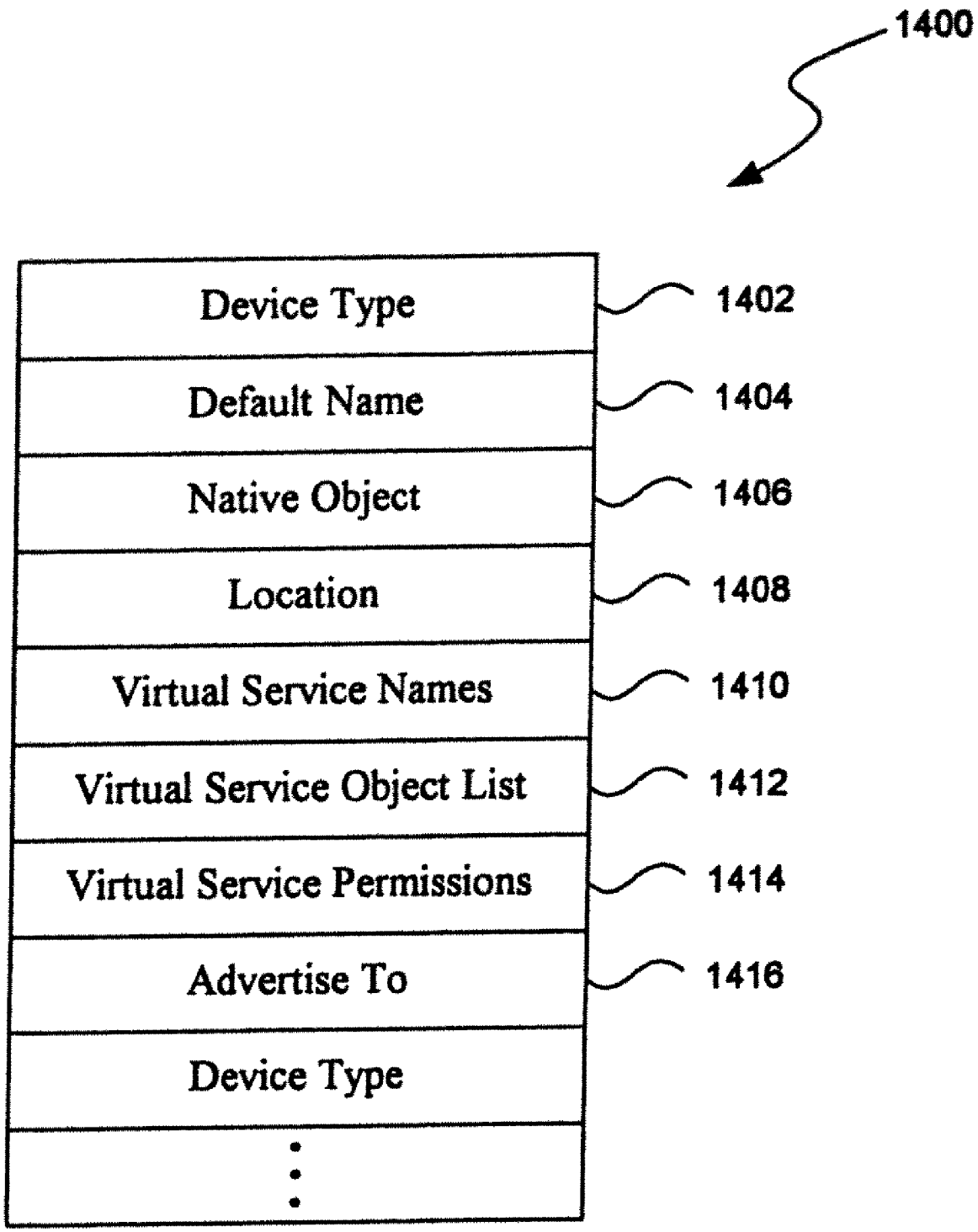
FIG. 14 illustrates a device entry included in the VDT shown in FIG. 8.

In FIG. 14, an example of a device entry 1400 included in the VDT 820 is shown. The device entry 1400 includes a device type field 1402, a default name field 1404, a native object field 1406, a location field 1408, a virtual service names field 1410, a virtual service object list field 1412, a virtual service permissions field 1414, and an advertise to field 1416.

The device type field 1402 specifies what type of device a discovered device is, such as PDA, printer, laptop, scanner, cordless headset, etc. The default name field 1404 contains a device name, as returned by the discovered device. This device name is provided as a character string. The native object field 1406 comprises a device object in native format, as returned by the discovered device. This device object, in the form of an object schema, provides the properties, behavior, and other information about the discovered device. For example, the object schema for a printer includes general description, location, name, driver, print queue, color profiles, and operations that can be performed on it, such as pause or resume. The fields 1402 and 1404 are identified during device discovery, e.g., blocks 1300 and 1302. The field 1406 is identified during service discovery, e.g., blocks 1304 and 1306. The location field 1408 provides the physical location of the discovered device, such as latitude and longitude; building, floor, and room; or global positioning satellite (GPS) coordinates. The location is identified, if possible, also during the device discovery but may be provided by an administrator's table, by identifying the connection to the discovered device or through a naming scheme convention from the name of the discovered device.

The virtual service names field 1410 includes individualized service names for each known user (by UID) or group (by GID), including a default name. In other words, a service name is created and associated with each UID and GID by the system administrator (such as in the block 1312). Then in response to a service discovery request by a user, the service name associated with that user is returned to the user device as a virtual service name. "The nearest printer," "My printer," and "Photo printer" discussed above are examples of virtual service names.

The virtual service object list field 1412 includes a list of objects schema mapped from the native object fields that specifies a set or subset of services to be advertised for the coverage area. This information is computed once service discovery of the discovered device is completed using a device equivalency list 822 (see FIG. 8). The content of the field 1412 is a mapping from the native object field 1406 into formats understandable by the user devices. The virtual service permissions field 1414 includes a list of permissions by UID or GID. The permissions given to a given user and/or group, e.g., write to, read from, etc. are set by the system administrator (such as during the block 1312). The advertise to field 1416 includes a list of device types that the discovered device can typically provide services to, absent permission restrictions, location restrictions, etc. The list of device types to advertise to, e.g., PDAs only, headsets only, all devices, etc., is a default value.

A device entry similar to the device entry 1400 exists for each discovered device. Thus, if 50 devices are discovered by successive iterations of the block 1300, then the VDT 820 will include 50 device entries. As the VDT 820 is updated, device entries associated with devices which are no longer discoverable, e.g., devices that have been removed from the coverage area, may be archived elsewhere or deleted from the VDT 820.

Figure 15:
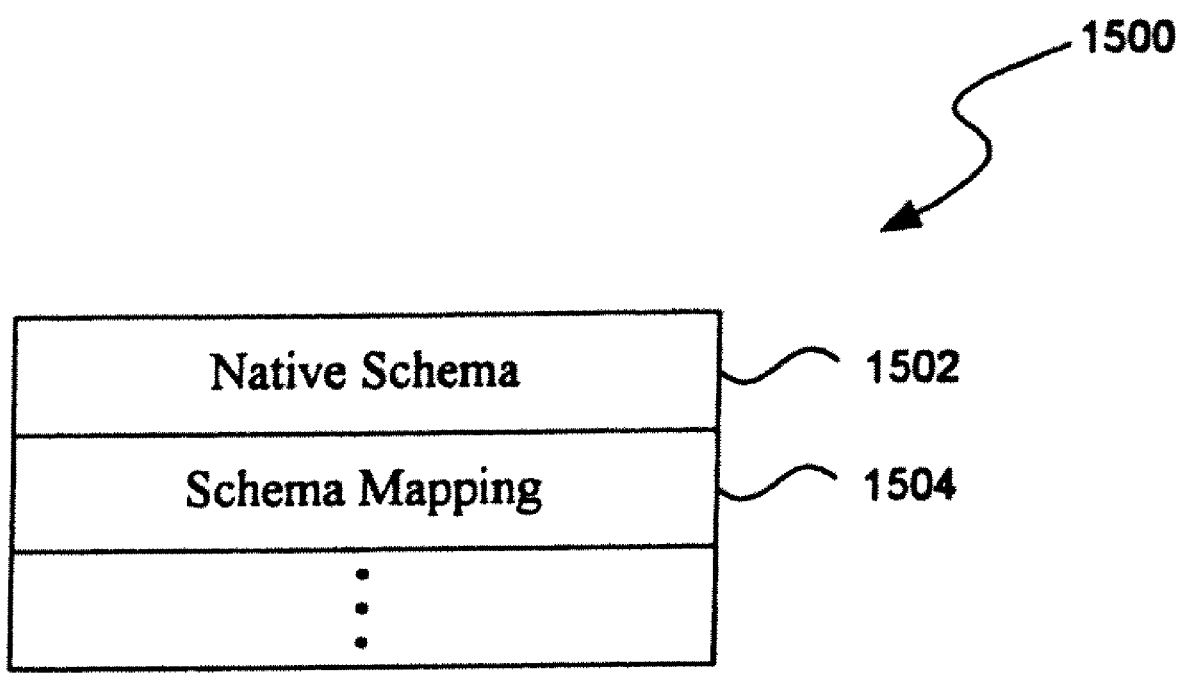
FIG. 15 illustrates a device entry included in a device equivalency list shown in FIG. 8.

In FIG. 15, a device entry 1500 included in the device equivalency list 822 is shown. The device equivalency list 822 is included in the virtual linking layer 806 (see FIG. 8). The list 822 is created during initial system configuration, as part of the programming of each service discovery protocol to be included in the virtual linking system 100.

The device entry 1500 includes a native schema field 1502 and a schema mapping field 1504. The native schema field 1502 includes a schema description of a discovered device such as its object schema in a native object field in the VDT 820. The schema mapping field 1504 includes a functional description of the discovered device, such that its object or native schema is translated into a virtual schema. In other words, the field 1504 identifies one or more device types that the discovered device can virtually become based on its functional capability or service request. For example, a discovered device that is a fax machine can be presented as a printer to a user device when the user device requests a service discovery to print. A device entry similar to device entry 1500 is repeated for each discovered device that can be a virtually equivalent device.

CONCLUSION

A system and method for transparent and non-transparent virtual linking is disclosed herein. A virtual linking system including one or more access points and controller is configured to provide mediation or pathways between a wireless device and resources that would not typically be able to link or connect to each other due to range restrictions, dissimilar protocols, lack of drivers, and/or other inherent limitations of the wireless device or resources. The virtual linking system provides seamless connectivity and translation functions to facilitate virtual linking, such that neither the wireless device nor the resources is aware that they are inherently non-compatible or non-native to each other. The virtual linking services further include intelligent and dynamic filtering to suit the needs of the user and the policies of the organization that is providing the services.

While base stations are generally described herein, aspects of the invention may employ any "Bluetooth switch." Such a switch may have less functionality and be cheaper to implement than the base station. Aspects of the invention apply to nodes in a network, such as network access points, stationary nodes in a picocellular communications network, peer-to-peer stationary network access points, and the like.

A picocellular communications network typically includes a wireless base station with extremely low power designed to cover an extremely small area, such as one floor of an office building. Indeed, short range wireless communication as described herein generally refers to an effective range of 500 meters or less (and with Bluetooth, often less than 100 meters) although some systems may reach up to 1 kilometer depending upon the wireless transmission protocol. Base station units described herein are generally fixed relative to a given location. The location may be any stationary building or geographic space (such as a parking lot or park). Alternatively, the base station units may be fixed relative to a movable object such as a vehicle (e.g., train or plane).

Those skilled in the relevant art will appreciate that the invention can be practiced with various telecommunications or computer system configurations, including Internet appliances, hand-held devices, wearable computers, palm-top computers, cellular or mobile phones, multi-processor systems, microprocessor-based or programmable consumer electronics, set-top boxes, network PCs, mini-computers, mainframe computers, and the like. Aspects of the invention can be embodied in a special purpose computer or data processor that is specifically programmed, configured, or constructed to perform one or more of the computer-executable instructions explained in detail herein. Data structures and transmission of data particular to aspects of the invention are also encompassed within the scope of the invention. In general, while hardware platforms such as stationary and mobile devices are described herein, aspects of the invention are equally applicable to nodes on the network having corresponding resource locators to identify such nodes.

Incorporated by reference herein are the following applications, which are assigned to the assignee of the present application: U.S. application Ser. No. 10/052,910 filed Jan. 18, 2002, entitled "Link Context Mobility Method and System for Providing such Mobility, such as a System Employing Short Range Spread Spectrum Wireless Protocols"; U.S. Application No. 60/288,296 filed May 2, 2001, entitled "Wireless Base Station Neighbor Discovery"; U.S. application Ser. No. 10/139,130 filed May 2, 2002, entitled "Wireless Base Station to Base Station Synchronization in a System, such as a System Employing a Short- or Time Division Duplex Scheme"; and U.S. application Ser. No. 10/139,609 filed May 2, 2002, entitled "Wireless Base Station to Base Station Synchronization in a System, such as a System Employing a Short- or Time Division Duplex Scheme". Aspects of the invention can be modified, if necessary, to employ the systems, functions and concepts of the various patents and applications described above to provide yet further embodiments of the invention.

Unless the context clearly requires otherwise, throughout the description and the claims, the words "comprise," "comprising" and the like are to be construed in an inclusive sense as opposed to an exclusive or exhaustive sense; that is tot say, in a sense of "including, but not limited to." Words using the singular or plural number also include the plural or singular number, respectively. Additionally, the words "herein," "above," "below," and words of similar import, when used in this application, shall refer to this application as a whole and not to any particular portion of this application.

The above description of illustrated embodiments of the invention is not intended to be exhaustive or to limit the invention to the precise form disclosed. While specific embodiments of, and examples for, the invention are described herein for illustrative purposes, various equivalent modifications are possible within the scope of the invention, as those skilled in the relevant art will recognize.

Unless described otherwise herein, the blocks or functionality depicted in the Figures are well known or described in detail in the above cross-referenced provisional patent application. Indeed, much of the detailed description provided herein is explicitly disclosed in the provisional patent application; much of the additional material of aspects of the invention will be recognized by those skilled in the relevant art as being inherent in the detailed description provided in such provisional patent application, or well known to those skilled in the relevant art. Those skilled in the relevant art can implement aspects of the invention based on the Figures and the detailed description provided in the provisional patent application.

These and other changes can be made to the invention in light of the above detailed description. In general, in the following claims, the terms used should not be construed to limit the invention to the specific embodiments disclosed in the specification and the claims, but should be construed to include all networked systems providing services to client devices that operate under the claims. Accordingly, the invention is not limited by the disclosure, but instead the scope of the invention is to be determined entirely by the claims.

While certain aspects of the invention are presented below in certain claim forms, the inventors contemplate the various aspects of the invention in any number of claim forms. For example, while only one aspect of the invention is recited as embodied in a computer-readable medium, other aspects may likewise be embodied in a computer-readable medium. Accordingly, the inventors reserve the right to add additional claims after filing the application to pursue such additional claim forms for other aspects of the invention.

The invention claimed is:

1. An apparatus for providing virtual linking between geographically distributed devices in a communication system in a network environment, comprising:
a controller, comprised in a virtual linking system of said communication system and coupled to said communication system, configured to facilitate said virtual linking of at least one user device with one of devices in response to a request from said at least one user device, wherein said one device of the devices is selected for the virtual linking with said at least one user device using a virtual device table comprising entries of capabilities for said devices, and by checking for a match of permission rights for connection between said at least one user device and said one device based on a corresponding entry for said one device in said virtual device table, wherein:
said at least one user device is configured to communicate using a first wireless protocol,
said devices are configured to communicate using one or more wireless protocols, each of said one or more wireless protocols being similar or dissimilar to said first wireless protocol, wherein said at least one user device cannot communicate directly with one or more of said devices under said first wireless protocol because of dissimilar wireless protocols or different or absent profiles between said at least one user device and said one or more of said devices, or because of wireless range limitations under said first wireless protocol,
and said virtual linking comprises connecting said at least one user device with said virtual linking system using said first wireless protocol, and further connecting said virtual linking system with said one device of said devices using said one of said one or more wireless protocols.

2. The apparatus of claim 1, wherein said controller comprises:
a wireless protocol layer configured to handle a wireless communication of said at least one user device with any of said devices; and
a virtual linking layer which comprises:
said virtual device table with entries of network resources,
said network resources comprising said devices, and
a permission filter, configured to perform said checking for the match of permission rights for connection between said at least one user device and any device from said devices based on corresponding entries for corresponding devices in said virtual device table.

3. The apparatus of claim 2, wherein said first wireless protocol is a short-range wireless protocol and said wireless protocol layer is a short-range wireless protocol layer comprising a radio layer and two or more user profiles.

4. The apparatus of claim 1, wherein said request from said at least one user device comprises: a device discovery request, a service discovery request, and a connection request.

5. The apparatus of claim 4, wherein said controller is configured:
to provide to said at least one user device, in response to said device discovery request, a virtual linking system's device name,
to provide to the at least one user device, in response to said service discovery request, a list of one or more candidate devices with desired capabilities selected from said devices using said virtual device table, for selecting by said at least one user device, by way of said connection request, said one device from said list for the virtual linking with said at least one user device,
to check in response to said service discovery request, for the match of permission rights for the connection between said at least one user device and each of the candidate devices in said list based on corresponding entries of said candidate devices in said virtual device table, and
to further check, in response to said connection request, for the match of the permission rights for the connection between the at least one user device and said one device based on said corresponding entry for said one device in said virtual device table.

6. The apparatus of claim 1, wherein one or selected wireless protocols of said one or more wireless protocols are short-range wireless protocols.

7. The apparatus of claim 6, wherein said controller comprises:
at least one transceiver, configured to communicate with said at least one user device using said first wireless protocol and with one or more of said devices using a corresponding protocol of said one or more wireless protocols, such that said controller is configured to function as an access point of said virtual linking system.

8. The apparatus of claim 1, wherein said communication system comprises a geographically distributed plurality of network resources, said network resources comprising said devices, such that said virtual device table comprises entries of capabilities of said plurality of network resources, and wherein said request from said at least one user device comprises a request to access one of said resources.

9. The apparatus of claim 8, wherein said virtual device table comprises a device entry for a device of said network resources, said device entry comprises:
a device type field,
a default name field,
a native object field comprising a device object in a native format, as returned by the device,
a location field providing the physical location of the device,
a virtual service names field including individualized service names for each known user by a user identification, or each known group by a group identification,
a virtual service object list field including a list of objects schema mapped from native object fields that specifies a set or subset of services to be advertised for a coverage area,
a virtual service permissions field including a list of permissions by a user identification or a group identification, and
an advertise to field including a list of device types that the device is capable of providing services to.

10. The apparatus of claim 9, wherein the permission filter is configured to perform said checking of the permission rights by comparing a user identification or a user group identification of said at least one user device with the virtual service permissions field of the device entry of any device of interest, and to compare a device type requested by the at least one user device with the advertise to field of the device entry of said any device of interest to check for the match between the at least one user device and any device of interest comprised in said network resources.

11. The apparatus of claim 1, wherein said virtual linking is transparent using the same wireless protocol for communicating between the at least one user device and one of said devices, such that the virtual linking system is configured to relay instructions and data between said at least one user device and said one of said devices,
and wherein said virtual linking is non-transparent using different protocols for communicating between the at least one user device and one of said devices, such that the virtual linking system is configured to mediate instructions and data between said at least one user device and said one of said devices.

12. The apparatus of claim 11, wherein said at least one user device and said one device of said devices enable the same short-range wireless protocol but do not have necessary user profiles in-common, such that said virtual linking is non-transparent.

13. The apparatus of claim 1, wherein said first wireless protocol is a BLUETOOTH protocol.

14. The apparatus of claim 1, wherein said one or selected wireless protocols of said one or more wireless protocols are BLUETOOTH protocols.

15. A method for providing virtual linking between geographically distributed devices in a communication system in a network environment, comprising:
receiving, by a controller comprised in a virtual linking system of said communication system and coupled to said communication system, a request for said virtual linking from at least one user device; and
setting up said virtual linking by said controller, wherein one device of devices is selected for the virtual linking with said at least one user device using a virtual device table comprising entries of capabilities for said devices, and by checking for a match of permission rights for connection between said at least one user device and said one device based on a corresponding entry for said one device in said virtual device table, wherein:
said at least one user device is configured to communicate using a first wireless protocol,
said devices are configured to communicate using one or more wireless protocols, each of said one or more wireless protocols being similar or dissimilar to said first wireless protocol, wherein said at least one user device cannot communicate directly with one or more of said devices under said first wireless protocol because of dissimilar wireless protocols or different or absent profiles between said at least one user device and said one or more of said devices, or because of wireless range limitations under said first wireless protocol,
and wherein said virtual linking comprises connecting said at least one user device with said virtual linking system using said first wireless protocol, and further connecting said virtual linking system with said one device of said devices using said one of said one or more wireless protocols.

16. The method of claim 15, wherein said request from said at least one user device comprises:
a service discovery request comprising desired capabilities of a device to establish said virtual linking with, and
a connection request, and wherein
said setting up by said controller said virtual linking comprises:
providing to the at least one user device, in response to said service discovery request, a list of one or more candidate devices with said desired capabilities selected from said devices using said virtual device table and based on checking for the match of permission rights for the connection between said at least one user device and each of the candidate devices in said list based on corresponding entries of said candidate devices in said virtual device table, for selecting by said at least one user device, by way of said connection request, said one device from said list for the virtual linking with said at least one user device; and
setting up by said controller a connection between said at least one user device and said one device, in response to said connection request, after checking for the match of the permission rights for the connection between the at least one user device and said one device based on a corresponding entry for said one device in said virtual device table.

17. The method of claim 16, wherein said request from said at least one user device, before the service discovery request and the connection request, comprises a device discovery request, and the method further comprises:
providing to said at least one user device, in response to said device discovery request, a virtual linking system's device name.

18. The method of claim 15, wherein said communication system comprises a geographically distributed plurality of network resources, said network resources comprising said devices, such that said virtual device table comprises entries of capabilities of said plurality of network resources, and wherein said request from said at least one user device comprises a request to access one of said resources.

19. The method of claim 18, wherein said virtual device table comprises a device entry for a device of said network resources, said device entry comprises:
a device type field,
a default name field,
a native object field comprising a device object in a native format, as returned by the device,
a location field providing the physical location of the device,
a virtual service names field including individualized service names for each known user by a user identification, or each known group by a group identification,
a virtual service object list field including a list of objects schema mapped from native object fields that specifies a set or subset of services to be advertised for a coverage area,
a virtual service permissions field including a list of permissions by a user identification or a group identification, and an advertise to field including a list of device types that the device is capable of providing services to.

20. The method of claim 19, wherein said checking of the permission rights is performed by comparing a user identification or a user group identification of said at least one user device with the virtual service permissions field of the device entry of any device of interest, and by comparing a device type requested by the at least one user device with the advertise to field of the device entry of said any device of interest to check for the match between the at least one user device and said any device of interest comprised in said network resources.

21. The method of claim 15, wherein said virtual linking is transparent using the same wireless protocol for communicating between the at least one user device and one of said devices, such that the virtual linking system is configured to relay instructions and data between said at least one user device and said one of said devices,
and wherein said virtual linking is non-transparent using different protocols for communicating between the at least one user device and one of said devices, such that the virtual linking system is configured to mediate instructions and data between said at least one user device and said one of said devices.

22. The method of claim 21, wherein said at least one user device and said one device of said devices enable the same short-range wireless protocol but do not have necessary user profiles in-common, such that said virtual linking is non-transparent.

23. The method of claim 15, wherein said first wireless protocol is a BLUETOOTH protocol.

24. The method of claim 15, wherein one or selected wireless protocols of said one or more wireless protocols are short-range wireless protocols or BLUETOOTH protocols.

25. A system in a network environment for providing virtual linking between geographically distributed devices, comprising:
at least one user device configured to communicate using a first wireless protocol;
devices, configured to communicate using one or more wireless protocols, each of said one or more wireless protocols being similar or dissimilar to said first wireless protocol, wherein said at least one user device cannot communicate directly with one or more of said devices under said first wireless protocol because of dissimilar wireless protocols or different or absent profiles between said at least one user device and said one or more of said devices, or because of wireless range limitations under said first wireless protocol; and
a virtual linking system, configured to provide said virtual linking of said at least one user device with any of said devices in response to a request from said at least one user device, wherein one device of said devices is selected for said virtual linking with said at least one user device using a virtual device table comprising entries of capabilities for said devices, and by checking for a match of permission rights for connection between said at least one user device and said one device based on a corresponding entry for said one device in said virtual device table,
wherein said virtual linking comprises connecting said at least one user device with said virtual linking system using said first wireless protocol, and further connecting said virtual linking system with said one device of said devices using said one of said one or more wireless protocols.

26. A computer software product, comprising a non-transitory computer-usable medium having computer readable instructions stored thereon for execution by a processor to perform a method for providing virtual linking between geographically distributed devices in a communication system in a network environment, said method comprising:
receiving, by a controller comprised in a virtual linking system of said communication system and coupled to said communication system, a request for said virtual linking from at least one user device; and
setting up said virtual linking by said controller, wherein one device of devices is selected for the virtual linking with said at least one user device using a virtual device table comprising entries of capabilities for said devices, and by checking for a match of permission rights for connection between said at least one user device and said one device based on a corresponding entry for said one device in said virtual device table, wherein:
said at least one user device is configured to communicate using a first wireless protocol,
said devices are configured to communicate using one or more wireless protocols, each of said one or more wireless protocols being similar or dissimilar to said first wireless protocol, wherein said at least one user device cannot communicate directly with one or more of said devices under said first wireless protocol because of dissimilar wireless protocols or different or absent profiles between said at least one user device and said one or more of said devices, or because of wireless range limitations under said first wireless protocol,
and wherein said virtual linking comprises connecting said at least one user device with said virtual linking system using said first wireless protocol, and further connecting said virtual linking system with said one device of said devices using said one of said one or more wireless protocols, or using said communication protocol different than said first wireless protocol, respectively.

* * * * *